(12) United States Patent
Gao et al.

(10) Patent No.: US 12,329,156 B2
(45) Date of Patent: *Jun. 17, 2025

(54) HERBICIDAL COMPOSITIONS INCLUDING DRIFT RETARDANT AGENTS AND METHODS OF MAKING THE SAME

(71) Applicant: Monsanto Technology LLC, Saint Louis, MO (US)

(72) Inventors: Jingsi Gao, Saint Louis, MO (US); Alison Macinnes, Wildwood, MO (US); David A. Morgenstern, Creve Coeur, MO (US)

(73) Assignee: MONSANTO TECHNOLOGY LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,747

(22) Filed: Sep. 15, 2023

(65) Prior Publication Data

US 2024/0016146 A1    Jan. 18, 2024

Related U.S. Application Data

(63) Continuation of application No. 17/144,769, filed on Jan. 8, 2021, now Pat. No. 11,793,195.

(Continued)

(51) Int. Cl.
*A01N 25/24* (2006.01)
*A01N 25/04* (2006.01)
(Continued)

(52) U.S. Cl.
CPC .............. *A01N 25/24* (2013.01); *A01N 25/04* (2013.01); *A01N 37/02* (2013.01); *A01N 37/12* (2013.01);
(Continued)

(58) Field of Classification Search
CPC ........ A01N 25/24; A01N 25/04; A01N 37/02; A01N 37/12; A01N 37/38; A01N 37/40; A01N 57/20; A01N 65/20
See application file for complete search history.

(56) References Cited

U.S. PATENT DOCUMENTS 5,576,451 A    11/1996    Trius Oliva et al.
6,753,003 B1   6/2004     Kober et al.
(Continued)

FOREIGN PATENT DOCUMENTS

CN    101971841 A    2/2011
CN    102532519 A    7/2012
(Continued)

OTHER PUBLICATIONS

English Translation of WO2019030096, 2019, IP.com, pp. 1-26. (Year: 2019).*

(Continued)

*Primary Examiner* — Trevor Love
(74) *Attorney, Agent, or Firm* — Harness, Dickey & Pierce, P.L.C.

(57) ABSTRACT

Herbicidal compositions for reducing off-site movement or drift of herbicides are described. The herbicidal compositions can include a drift retardant agent (DRA) along with at least one auxin herbicide and an emulsifying agent, such as an alkylpolysaccharide, a phosphate ester, an alkoxylated castor oil, or a combination thereof. Methods of making such composition are also described.

20 Claims, 5 Drawing Sheets

Related U.S. Application Data

(60) Provisional application No. 62/959,429, filed on Jan. 10, 2020.

(51) Int. Cl.
    *A01N 37/02*     (2006.01)
    *A01N 37/12*     (2006.01)
    *A01N 37/38*     (2006.01)
    *A01N 37/40*     (2006.01)
    *A01N 57/20*     (2006.01)
    *A01N 65/20*     (2009.01)

(52) U.S. Cl.
    CPC ............. *A01N 37/38* (2013.01); *A01N 37/40* (2013.01); *A01N 57/20* (2013.01); *A01N 65/20* (2013.01)

(56) References Cited

U.S. PATENT DOCUMENTS

| | | |
|---|---|---|
| 7,993,631 B2 | 8/2011 | Takeda et al. |
| 9,743,664 B2 | 8/2017 | Hemminghaus et al. |
| 11,793,195 B2 | 10/2023 | Gao et al. |
| 12,133,526 B1 | 11/2024 | Palmer, Jr. et al. |
| 2001/0034304 A1 | 10/2001 | Volgas et al. |
| 2005/0112081 A1 | 5/2005 | Loeffler et al. |
| 2008/0260663 A1 | 10/2008 | Yamato et al. |
| 2011/0086760 A1 | 4/2011 | Casana Giner et al. |
| 2013/0035234 A1 | 2/2013 | Estrine et al. |
| 2013/0109572 A1 | 5/2013 | Pernak et al. |
| 2013/0252812 A1 | 9/2013 | Shao et al. |
| 2013/0252817 A1 | 9/2013 | Shao et al. |
| 2014/0128264 A1 | 5/2014 | Hemminghaus et al. |
| 2015/0133299 A1 | 5/2015 | Shao et al. |
| 2015/0264924 A1 | 9/2015 | Hemminghaus et al. |
| 2015/0296775 A1 | 10/2015 | Olds et al. |
| 2016/0192645 A1* | 7/2016 | Zhang .................... A01N 41/10 504/144 |
| 2016/0278370 A1 | 9/2016 | Qin et al. |
| 2019/0327960 A1 | 10/2019 | Hemminghaus et al. |

FOREIGN PATENT DOCUMENTS

| | | | |
|---|---|---|---|
| CN | 105112169 A | 12/2015 | |
| WO | WO-9608150 A1 | 3/1996 | |
| WO | WO2011/019652 | 2/2011 | |
| WO | WO-2014071374 A2 | 5/2014 | |
| WO | WO-2015069984 A1 | 5/2015 | |
| WO | WO-2018126017 A1 | 7/2018 | |
| WO | WO2018/218016 | 11/2018 | |
| WO | WO2018/218035 | 11/2018 | |
| WO | WO2019030096 | * 2/2019 | ............ C08K 5/04 |
| WO | WO2019/092199 | 5/2019 | |
| WO | WO-2019092158 A1 | 5/2019 | |
| WO | WO2019/212888 | 11/2019 | |
| WO | WO2019/236723 | 12/2019 | |
| WO | WO-2019236723 A1 | 12/2019 | |

OTHER PUBLICATIONS

U.S. Appl. No. 17/144,769, filed Jan. 8, 2021, Gao et al.
EP 21738096.3: Extended European Search Report dated Dec. 21, 2023. EP21738096.3.
EP 21738097.1: Extended European Search Report dated Dec. 11, 2023. EP 21738097.1.
Knothe, G.; Cermak, S.C.; Evangelista, R.L., "Methyl Esters from Vegetable Oils with Hydroxy Fatty Acids: Comparison of Lesquerella and Castor Methyl Esters," *Fuel*, 2012, 96, 535-40.
Zhang, Bo-Xing et al., "Improvement of the rheological properties of trans-1,4-polyisoprene from *Eucommia ulmoides* Oliver by tri-branched poly(ricinoleic acid)," *Polymer Journal*, 2016, 48, 821-827.
Bauer, Martin et al., "In-Can Drift Control Technology For Auxin Herbicides," *Proceedings ISAA*, 2016, 161-167.
Shalaby et al. "Role played by the head size of some non-ionic surfactants on their adsorption into montmorillonite clay", Polym. Adv. Technol. 2004, vol. 15, pp. 533-538.

\* cited by examiner

HERBICIDAL COMPOSITIONS INCLUDING DRIFT RETARDANT AGENTS AND METHODS OF MAKING THE SAME

CROSS-REFERENCE TO RELATED APPLICATION

This application is a continuation of U.S. Nonprovisional application Ser. No. 17/144,769, filed Jan. 8, 2021, which claims the benefit of and priority to U.S. Provisional Application Ser. No. 62/959,429, filed Jan. 10, 2020. The entire disclosures of each of these references are hereby incorporated by reference.

TECHNICAL FIELD

The disclosure relates generally to herbicidal composition concentrates including at least one auxin herbicide, at least one drift retardant agent (DRA), and an emulsifying agent. The disclosure further relates generally to methods of making such herbicidal composition concentrates as well as DRA compositions for use in the preparation of a herbicidal application mixture.

BACKGROUND

Auxin herbicides, such as dicamba (3,6-dichloro-2-methoxybenzoic acid) and 2,4-D (2,4-dichlorophenoxyacetic acid), are commonly used to control auxin-susceptible plant growth on both agricultural and non-agricultural lands. Off-site movement of these herbicides has become a source of concern and can result in restrictions on the use of these herbicides. For example, migration of these herbicides from the application site to adjacent crop plants, such as soybeans and cotton, can occur causing contact damage to sensitive plants. Auxin herbicide off-site movement can occur by three primary mechanisms: physical movement or drift of small particles in the spray, contamination of the sprayer, and volatility of the herbicide after application. Monsanto has addressed volatility by adding potassium acetate, with the trade name Vaporgrip™ technology, to auxin herbicide formulations.

To address drift issues, drift retardant agents (DRAs) (also known as drift reduction agents or drift control agents) can be included in herbicidal compositions. DRAs for herbicidal sprays can work by modifying the size distribution of particles formed by the nozzle, for example, by partially suppressing the formation of the smallest particles, also known as driftable fines, which settle slowest and are most prone to drift with the wind. Definitions of the size limit of "driftable fines" vary, but particles with a diameter below 150 μm are typically considered susceptible to drift. There are typically two types of DRAs. The first type of DRA is polymers, which can increase the extensional viscosity of the spray mixture. These polymers, limited in commercial practice to polyacrylamides, polyethylene oxide, and guar gum, can shift the spray particle size distribution to larger diameters. While such polymers can be effective in reducing driftable fines for some nozzles, for example, the Turbo TeeJet® Induction (TTI™) nozzle from TeeJet and the HYPRO® Ultra Lo-Drift (ULD) nozzle, they can be less preferred because they can result in significantly coarser spray, which can provide poorer coverage, compromising weed control. Furthermore, such polymers, if incorporated into an herbicidal formulation, can generally result in unacceptably high viscosity.

The second type of DRA is known as "oil-type" or "emulsion-type" DRAs. As the name suggests, an oil-type DRA, largely immiscible with water, can be included in a tank formulation as an emulsion or micro-emulsion. Drift retardants of this type are available commercially as additives to a spray tank under brand names, such as Border EG (Precision Labs) and InterLock® (Winfield). These oil-type or emulsion-type DRAs can be effective at the suppression of driftable fines, work well in a wide variety of nozzles, and can have less effect on the average particle size of the spray; thus, providing better application coverage and herbicidal efficacy. While the use of oil-type or emulsion-type DRAs as a tank additive is common and straightforward, incorporation into an auxin herbicidal formulation remains technically challenging, particularly for producing auxin herbicidal formulations with a high load of auxin herbicide. For example, auxin herbicides, such as dicamba and 2,4-D, are typically formulated as salts in concentrated aqueous solution. It is well known that stabilizing an emulsion in concentrated salt solution is very difficult because emulsifiers perform poorly at high ionic strength. Current commercial examples are Dow's Enlist Duo® and Enlist One™ products, which incorporate a proprietary emulsion-type DRA into an aqueous solution of the choline salt of 2,4-D. Enlist Duo® also includes the dimethylamine salt of glyphosate. There is also a published report from Clariant of a proprietary DRA that can be incorporated into the diglycolamine (DGA) salt of dicamba.

Accordingly, auxin herbicide compositions having a DRA incorporated therein for reducing drift of the herbicide are desirable, particularly reduced-drift compositions that exhibit no significant reduction in herbicidal effectiveness relative to currently available compositions.

BRIEF SUMMARY

New and useful herbicidal compositions including a drift retardant agent (DRA) and methods of making the same are set forth in the appended claims. Illustrative embodiments are also provided to enable a person skilled in the art to make and use the claimed subject matter.

In one aspect, an herbicidal composition concentrate is described. The herbicidal composition concentrate includes at least one auxin herbicide, at least one drift retardant agent, and an emulsifying agent selected from the group consisting of a phosphate ester, an alkylpolysaccharide, an alkoxylated castor oil, and a combination thereof. The at least one drift retardant agent includes one or more of: soybean oil or a methyl ester of soybean oil; a compound according of Formula I:

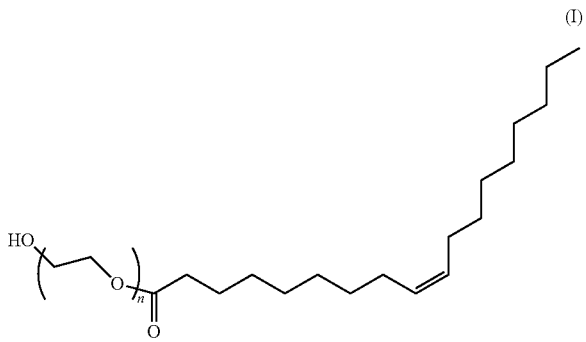

wherein n is 50-250; and a compound of Formula II

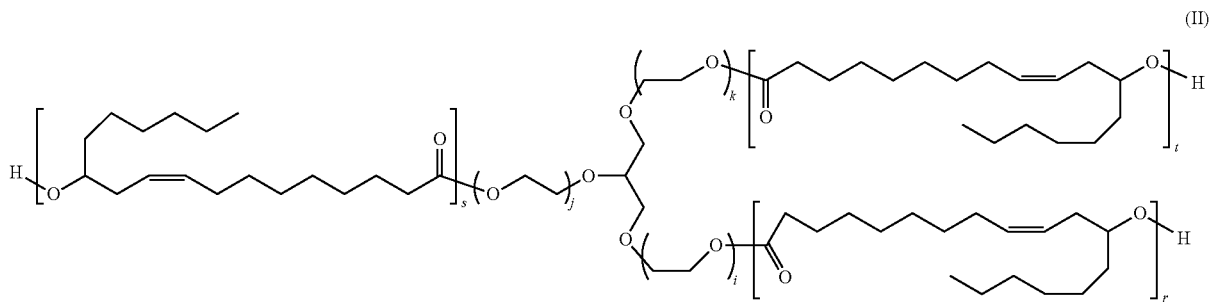

wherein i+j+k=10 to 50 and r+s+t=3 to 12. In some embodiments, the auxin herbicide is selected is selected from the group consisting of dicamba, an agriculturally acceptable salt of dicamba, an agriculturally acceptable ester of dicamba, 2,4-D, an agriculturally acceptable salt of 2,4-D, an agriculturally acceptable ester of 2,4-D, and a combination thereof. In some embodiments, the herbicidal composition further includes at least one monocarboxylic acid or a monocarboxylate thereof.

In another aspect, a method of making an herbicidal composition concentrate is described. The method includes admixing at least one auxin herbicide with at least one drift retardant agent, and an emulsifying agent to form the herbicidal composition concentrate. The at least one drift retardant agent includes one or more of: soybean oil or a methyl ester of soybean oil; a compound according of Formula I:

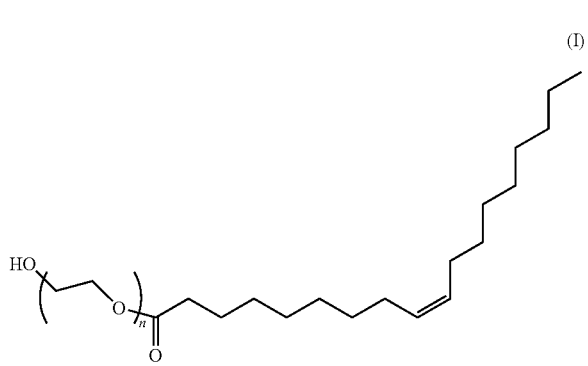

wherein n is 50-250; and a compound of Formula II

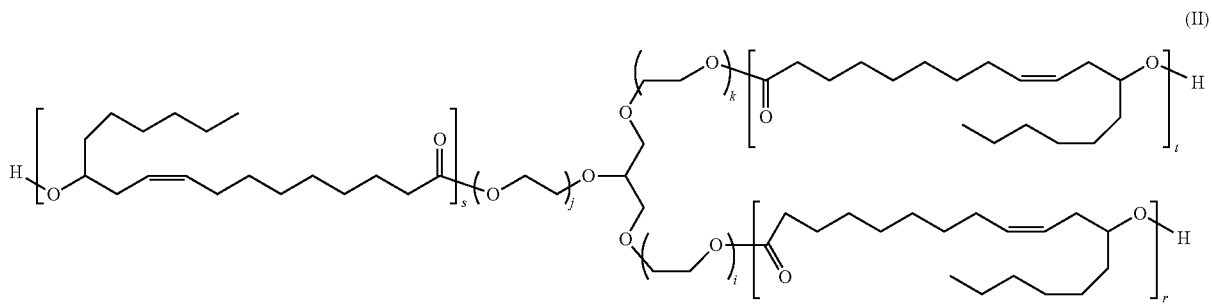

wherein i+j+k=10 to 50 and r+s+t=3 to 12. The emulsifying agent is selected from the group consisting of a phosphate ester, an alkylpolysaccharide, an alkoxylated castor oil, and a combination thereof. In some embodiments, the auxin herbicide is selected is selected from the group consisting of dicamba, an agriculturally acceptable salt of dicamba, an agriculturally acceptable ester of dicamba, 2,4-D, an agriculturally acceptable salt of 2,4-D, an agriculturally acceptable ester of 2,4-D, and a combination thereof. In some embodiments, the method further includes admixing at least one monocarboxylic acid or a monocarboxylate thereof with the at least one auxin herbicide, the at least one drift retardant agent, and the emulsifying agent.

In another aspect a drift retardant agent composition for use in the preparation of a herbicidal application mixture is described. The drift retardant agent composition includes at least one drift retardant agent, and an emulsifying agent. The at least one drift retardant agent includes soybean oil or a methyl ester of soybean oil, poly(oxy-1,2-ethanediyl), α-[(9Z)-1-oxo-9-octadecen-1-yl]-ω-hydroxy-, and octadecanoic acid, 12-hydroxy-, homopolymer, ester with α, α', α''-1,2,3-propanetriyltris[ω-hydroxypoly(oxy-1,2-ethanediyl)]. The emulsifying agent is selected from the group consisting of a phosphate ester, alkylpolysaccharide, an alkoxylated castor oil, and a combination thereof.

Further benefits of the present invention will be apparent to one skilled in the art from reading this patent application. The embodiments of the invention described in the following paragraphs are intended to illustrate the invention and should not be deemed to narrow the scope of the invention.

DETAILED DESCRIPTION OF EXAMPLE EMBODIMENTS

Figure 1A:
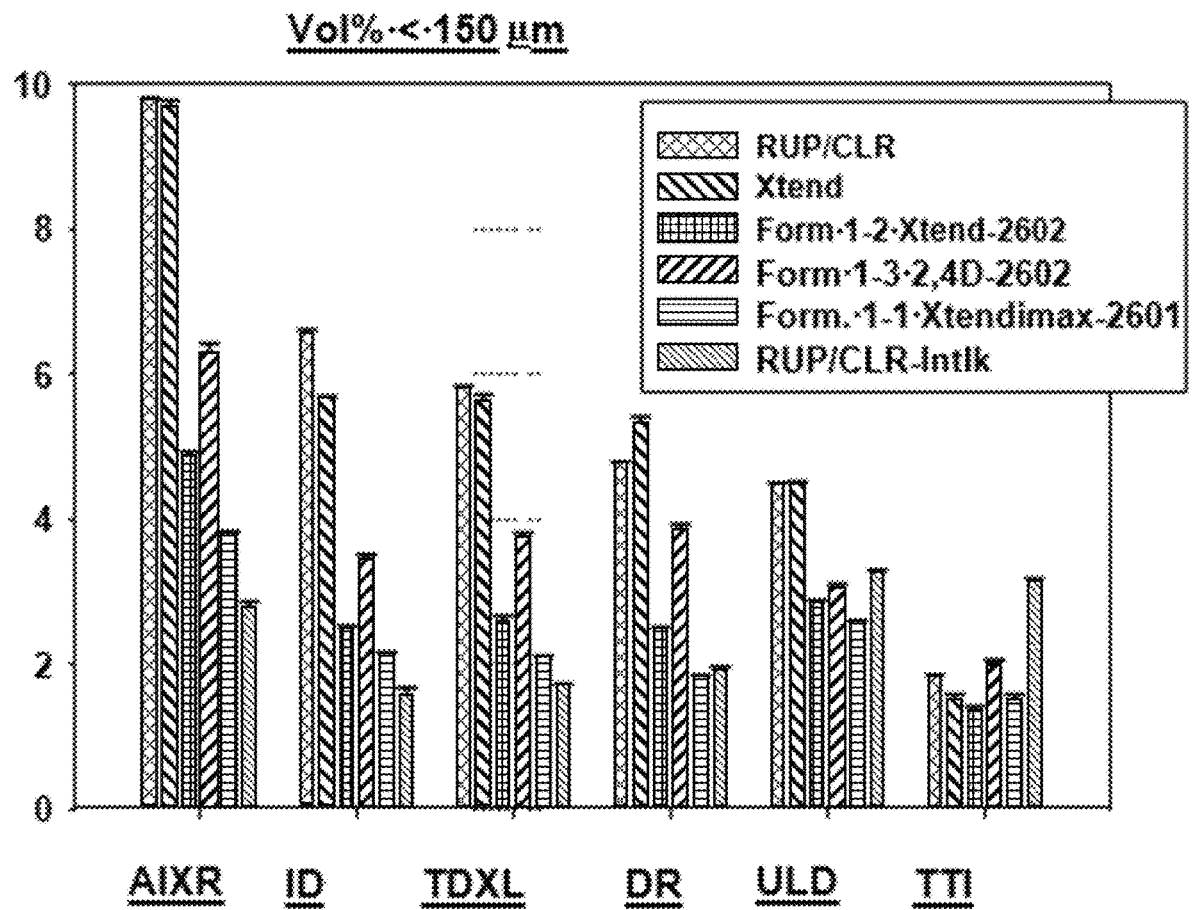
FIGS. 1A and 1B illustrate diglycolamine (DGA) dicamba compositions with built-in drift retardant agents compared to a Powermax® II/Clarity alone and with Interlock® at 6 oz/acre (ac).

The following description of example embodiments provides information that enables a person skilled in the art to make and use the subject matter set forth in the appended claims, but it may omit certain details already well known in the art. The following detailed description is, therefore, to be taken as illustrative and not limiting.

The present invention provides herbicidal composition concentrates comprising an auxin herbicide wherein the compositions exhibit reduced drift. Specifically, the compositions include, in addition to the auxin herbicide, at least one drift retardant agent (DRA), and an emulsifying agent. The at least one drift retardant agent can include soybean oil or a methyl ester of soybean oil, poly(oxy-1,2-ethanediyl), α-[(9Z)-1-oxo-9-octadecen-1-yl]-ω-hydroxy-, and octadecanoic acid, 12-hydroxy-, homopolymer, ester with α, α', α''-1,2,3-propanetriyltris[ω-hydroxypoly(oxy-1,2-ethanediyl)]. The emulsifying agent can be selected from the group consisting of a phosphate ester, an alkylpolysaccharide, an alkoxylated castor oil, and a combination thereof. The compositions can also include at least one monocarboxylic acid or a monocarboxylate thereof for reducing volatility of the herbicide upon application.

Typically, auxin herbicides, such as dicamba and 2,4-D, are formulated as salts in concentrated aqueous solution. It is well known that stabilizing an emulsion in a concentrated salt solution is very difficult because emulsifiers perform poorly at high ionic strength. Additionally, inclusion of a monocarboxylic acid or a monocarboxylate thereof for reducing volatility further increases the ionic strength of the composition subsequently increasing the difficulty in stabilizing an emulsion of an oil type DRA and the difficulty in preventing undesirable creaming. However, it has surprisingly been discovered that emulsions and micro-emulsions of DRAs can be stabilized in solutions with auxin herbicides, particularly high loads of auxin herbicides in salt form (e.g., monoethanolamine (MEA) salt of dicamba) as well as compositions including a monocarboxylic acid or a monocarboxylate, such potassium acetate. It has been surprisingly discovered that the DRAs described herein can be included with the auxins described herein by including an emulsifying agent, such as a phosphate ester, an alkylpolysaccharide, an alkoxylated castor oil, or a combination thereof, to form a stable emulsion or a micro-emulsion. The compositions described herein can control drift with a small amount of DRA, for example, as little as about 0.5 oz/acre of DRA, drastically less than the 4-6 oz/acre labeled rate of Interlock™. Incorporating a reduced amount of DRA was critical in achieving stable emulsion and micro-emulsion formulations with the DRA and auxin.

The compositions provided herein can advantageously protect against drift of auxins, such as dicamba and 2,4-D, when applied with many common nozzles per label directions. Additionally, the compositions can provide assurance of compliance when a DRA is required, thus enhancing product stewardship. Incorporation of the DRA into the herbicidal composition concentrate also provides convenience and cost savings for growers and applicators compared to purchasing and adding an herbicide and a DRA separately. In various aspects, the DRAs described herein provide substantial suppression of fines with nozzles, such as, but not limited to Greenleaf TurboDrop® XL (TDXL), Lechler I D, Wilger D R, Teejet® AIXR, and Teejet® TTI, without significantly increasing the mean particle size of the spray. The compositions described herein with a built-in DRA enable improved spray quality with better coverage and weed control.

A. Auxin Herbicide Component

The term "auxin herbicide" refers to an herbicide that functions as a mimic of an auxin plant growth hormone, thereby affecting plant growth regulation. Examples of auxin herbicides that are suitable for use in the herbicidal compositions of the present invention include, without limitation, benzoic acid herbicides, phenoxy herbicides, pyridine carboxylic acid herbicides, pyridine oxy herbicides, pyrimidine carboxy herbicides, quinoline carboxylic acid herbicides, and benzothiazole herbicides.

Examples of auxin herbicides include, but are not limited to: 3,6-dichloro-2-methoxybenzoic acid (dicamba); 2,4-dichlorophenoxyacetic acid (2,4-D); 4-(2,4-dichlorophenoxy) butyric acid (2,4-DB); dichloroprop; 2-methyl-4-chlorophenoxyacetic acid (MCPA); 4-(4-chloro-2-methylphenoxy) butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylic acid; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylic acid; methyl 4-amino-3-chloro-5-fluoro-6-(7-fluoro-1-isobutyryl-1H-indol-6-yl)pyridine-2-carboxylic acid; methyl 4-amino-3-chloro-6-[1-(2,2-dimethylpropanoyl)-7-fluoro-1H-indol-6-yl]-5-fluoropyridine-2-carboxylic acid; methyl 4-amino-3-chloro-5-fluoro-6-[7-fluoro-1-(methoxyacetyl)-1H-indol-6-yl]pyridine-2-carboxylic acid; methyl 6-(1-acetyl-7-fluoro-1H-indol-6-yl)-4-amino-3-chloro-5-fluoropyridine-2-carboxylic acid; butyl 4-amino-3-chloro-5-fluoro-6-(7-fluoro-1H-indol-6-yl)pyridine-2-carboxylic acids, including salts and esters thereof; racemic mixtures and resolved isomers thereof; and combinations thereof.

In any embodiment, the herbicidal composition concentrate can include dicamba, or an agriculturally acceptable salt or ester thereof. Examples of suitable dicamba salts include, but are not limited to N,N-bis-[aminopropyl]methylamine, monoethanolamine (MEA), dimethylamine (e.g., BANVEL®, ORACLE®, etc.), isopropylamine, triethanolamine (TEA), diglycolamine (e.g., CLARITY®, VANQUISH®, etc.), potassium, and sodium salts, and combinations thereof. Commercially available sources of dicamba, and its agriculturally acceptable salts, include those products sold under the trade names BANVEL®, CLARITY®, DIABLO®, DISTINCT, ORACLE®, VANQUISH®, and VISION®.

In any embodiment, the herbicidal composition concentrate can include an agriculturally acceptable dicamba salt, wherein the salt is selected from the group consisting of N,N-[aminopropyl]methylamine, monoethanolamine, dimethylamine, isopropylamine, diglycolamine, a potassium salt, and a sodium salt, and combinations thereof.

Throughout the remainder of the description of the invention, where reference is made to dicamba, or an agriculturally acceptable salt or ester thereof, one skilled in the art will understand that the principles of the present invention apply to auxin herbicides generally, including those described above, and that the present invention is not limited to herbicidal compositions containing dicamba, or an agriculturally acceptable salt or ester thereof.

Additionally or alternatively, the herbicidal composition concentrate can include 2,4-D, or an agriculturally acceptable salt or ester thereof. Examples of suitable 2,4-D salts include, but are not limited to the choline, dimethylamine, triethanolamine, and isopropylamine salts, and combinations thereof. Examples of suitable 2,4-D esters include, but are not limited to methyl, ethyl, propyl, butyl (2,4-DB), and isooctyl esters, and combinations thereof. Commercially available sources of 2,4-D, and its agriculturally acceptable salts and esters, include those products sold under the trade names BARRAGE®, FORMULA 40®, OPT-AMINE®, and WEEDAR 64®.

Additionally or alternatively, the herbicidal composition concentrate can include an agriculturally acceptable 2,4-D salt, wherein the salt is selected from the group consisting of choline, dimethylamine, triethanolamine, and isopropylamine salts, and combinations thereof.

Additionally or alternatively, the herbicidal composition concentrate can include an agriculturally acceptable 2,4-D ester, wherein the ester is selected from the group consisting of butyl (i.e., 2,4-DB) and isooctyl esters, and combinations thereof.

Additionally or alternatively, the herbicidal composition concentrate can include at least two auxin herbicides, for example, dicamba, or an agriculturally acceptable salt or ester thereof, and 2,4-D, or an agriculturally acceptable salt or ester thereof.

Additionally or alternatively, the herbicidal composition concentrate can include an agriculturally acceptable auxin herbicide salt (such as a dicamba salt, a 2,4-D salt, and/or a 2,4-DB salt) that is an ionic liquid as described in published application US 2013/0109572, i.e., a salt that is a liquid at a temperature at or below about 150° C. The entire text of US 2013/0109572 is incorporated by reference into this application.

B. Drift Retardant Agent (DRA) Component

In various aspects, the DRA may include one or more of an oil or an ester thereof, a poly(ethyleneglycol)monooleate, and a polymer.

The oil or an ester thereof may be present in the DRA in amount, by weight of the DRA, of greater than or equal to about 50%, greater than or equal to about 60%, greater than or equal to about 70%, greater than or equal to about 80%, greater than or equal to about 85%, greater than or equal to about 90%, or about 95%; or from about 50% to about 95%, about 70% to about 95%, about 80% to about 95%, about 85% to about 95%, or about 90% to about 95%. The poly(ethyleneglycol)monooleate may be present in the DRA in amount, by weight of the DRA, of greater than or equal to about 0.10%, greater than or equal to about 0.25%, greater than or equal to about 0.5%, greater than or equal to about 1%, greater than or equal to about 5%, or about 10%; from about 0.1% to about 10%, about 0.25% to about 10%, about 0.5% to about 10%, or about 1% to about 5%. The polymer may be present in the DRA in amount, by weight of the DRA, of greater than or equal to about 1%, greater than or equal to about 3%, greater than or equal to about 5%, greater than or equal to about 10%, greater than or equal to about 20%, greater than or equal to about 30%, greater than or equal to about 40%, or about 50%; or from about 1% to about 50%, about 3% to about 50%, about 5% to about 40%, or about 10% to about 30%.

A suitable oil includes, but is not limited to soybean oil (e.g., CAS Registry Number 8001-22-7) or an ester of soybean oil, for example, a methyl ester of soybean oil (e.g., CAS Registry Number 67784-80-9). Suitable poly(ethyleneglycol)monooleates include, but are not limited to compounds of Formula I:

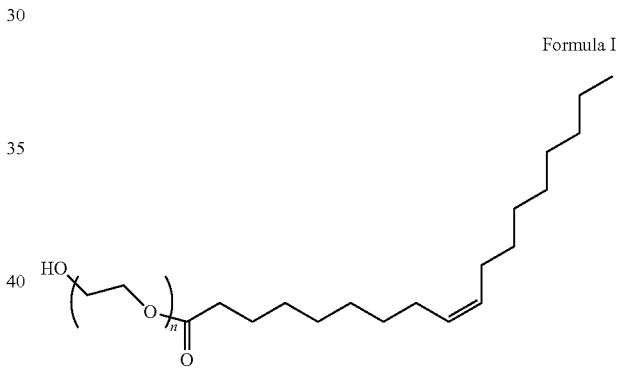

Formula I where n is 50-250. In some embodiments, the poly(ethyleneglycol)monooleate can be poly(oxy-1,2-ethanediyl), α-[(9Z)-1-oxo-9-octadecen-1-yl]-ω-hydroxy- (e.g., CAS Registry Number 9004-96-0).

Suitable polymers include, but are not limited to compounds of Formula II:

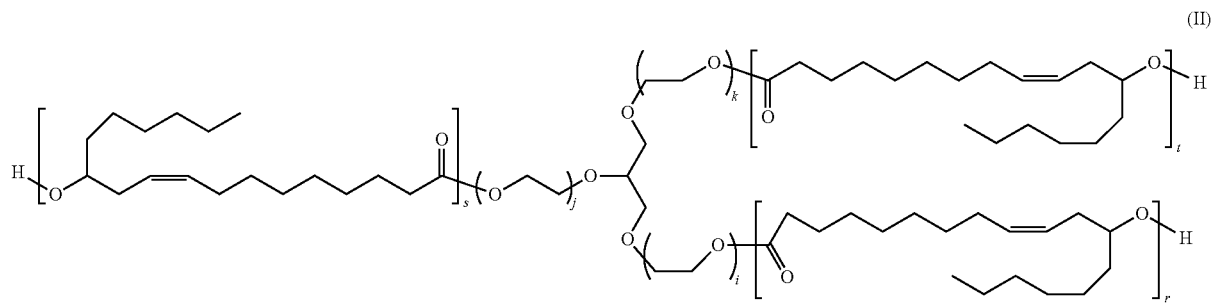

(II)

wherein i+j+k=10 to 50 or 20 to 35 and r+s+t=3 to 12 or 4 to 8. In any embodiment, each of i, j, and k independently can be an integer from zero to 50, an integer from zero to 35, an integer from zero to 20, an integer from zero to 10, an integer from 1 to 50, an integer from 1 to 35, an integer from 1 to 20, an integer from 1 to 10, an integer from 5 to 50, an integer from 5 to 35, an integer from 5 to 20, or an integer from 5 to 10. For example, i can be 1, j can be 5, and k can be 4; or i can be zero, j can be 10, and k can be 12, and so on. In any embodiment, each of r, s, and t independently can be an integer from zero to 12, an integer from zero to 8, an integer from zero to 4, an integer from zero to 3, an integer from 1 to 12, an integer from 1 to 8, an integer from 1 to 4, an integer from 1 to 3, an integer from 2 to 12, an integer from 2 to 8, an integer from 2 to 4, or an integer from 2 to 3. For example, r can be 1, s can be 1, and t can be 1; or r can be zero, s can be 3, and t can be 5, and so on. In some embodiments, the polymer can be octadecanoic acid, 12-hydroxy-, homopolymer, ester with α, α', α"-1,2,3-propanetriyltris[ω-hydroxypoly(oxy-1,2-ethanediyl)] (e.g., CAS Registry Number 1939051-18-9).

C. Emulsifying Agent Component

While it is known that herbicidal activity of herbicides, such as glyphosate, can be enhanced by certain cationic surfactants, for example, tallowamine ethoxylates, it was found that such surfactants are incompatible with the compositions including a combination of an auxin herbicide (e.g., dicamba) and a DRA as described herein, and optionally, a monocarboxylic acid or the monocarboxylate thereof (e.g., potassium acetate). However, it has been surprisingly found that emulsifying agents, such as a phosphate ester, an alkylpolysaccharide, an alkoxylated castor oil, or a combination thereof can be included in the compositions described herein and stabilize emulsions or micro-emulsions of the DRA and the auxin herbicide and prevent creaming of the DRA. As used herein "emulsifying agent" is intended to encompass surfactants and solvents. Additionally, the emulsifying agents described herein can provide a comparable level of glyphosate activity against weeds. Thus, the composition concentrates described herein can control drift and provide an effective combination of two herbicides, for example, dicamba and glyphosate or dicamba and glufosinate, in a convenient, stable, concentrated mixture, optionally including a monocarboxylic acid or the monocarboxylate thereof (e.g., potassium acetate, such as Vaporgrip™ Technology) to control volatility of dicamba.

In any embodiment, the emulsifying agent may be a phosphate ester. Examples of suitable phosphate esters include, but are not limited to alkoxylated phosphate esters of fatty acids. The alkoxylation may include alkoxy chain of any length. For example, polyethylene oxide or polypropylene oxide. Examples of said esters include polyethylene glycol octyl phosphate, polyethylene glycol isotridecyl phosphate, polyethylene glycol cetearyl phosphate, polyethylene glycol decyl phosphate, polyethylene glycol oleyl phosphate, polyethylene glycol polypropylene glycol cetyl phosphate, polyethylene glycol tridecyl phosphate, and polyethylene glycol isotridecyl phosphate. Non-limiting examples of commercially available phosphate esters include Stepfac® 8182, Stepfac® 8181 and Stepfac® 8180, Toximul® TAABS-8 and Toximul® TAABS-5.

Additionally or alternatively, the emulsifying agent may be an alkylpolysaccharide. Examples of suitable alkylpolysaccharide include, but are not limited to compounds of Formula (1):

$$R^{11}-O-(sug)_u \quad \text{Formula (1)}$$

wherein $R^{11}$ is a straight or branched chain substituted or unsubstituted hydrocarbyl selected from alkyl, alkenyl, alkylphenyl, alkenylphenyl having from about 4 to about 22 carbon atoms for from about 4 to 18 carbon atoms. The sug moiety is a saccharide residue, and may be an open or cyclic (i.e., pyranose) structure. The saccharide may be a monosaccharide having 5 or 6 carbon atoms, a disaccharide, an oligosaccharide or a polysaccharide. Examples of suitable saccharide moieties, including their corresponding pyranose form, include ribose, xylose, arabinose, glucose, galactose, mannose, telose, gulose, allose, altrose, idose, lyxose, ribulose, sorbose (sorbitan), fructose, and mixtures thereof. Examples of suitable disaccharides include maltose, lactose and sucrose. Disaccharides, oligosaccharides and polysaccharides can be a combination of two or more identical saccharides, for example maltose (two glucoses) or two or more different saccharides, for example sucrose (a combination of glucose and fructose). The degree of polymerization, u, is an average number from 1 to about 10, from 1 to about 8, from 1 to about 5, from 1 to about 3, and from 1 to about 2.

In various embodiments, the alkylpolysaccharide may be an alkylpolyglucoside (APG) surfactant of Formula (1) wherein: $R^{11}$ is a branched or straight chain alkyl group preferably having from 4 to 22 carbon atoms or from 8 to 18 carbon atoms, or a mixture of alkyl groups having an average value within the given range; sug is a glucose residue (e.g., a glucoside); and u is from 1 to about 5, and more preferably from 1 to about 3. In various embodiments, the emulsifying agent component comprises an APG of Formula (1) wherein $R^{11}$ is a branched or straight chain alkyl group having from 8 to 10 carbon atoms or a mixture of alkyl groups having an average value within the given range and u is from 1 to about 3.

Non-limiting examples of commercially available alkylpolyglucosides include, for example, APG®, AGNIQUE®, or AGRIMUL® surfactants from BASF Inc., for example, Agnique PG 264, Agnique PG 8105, and Agnique 8107.

Additionally or alternatively, the emulsifying agent may be an alkoxylated castor oil, for example an ethoxylated castor oil or a proproxylated castor oil. Alkoxylated castor oil can be prepared by reaction of castor oil or hydrogenated castor oil with ethylene oxide, propylene oxide, ethylene glycol, or propylene glycol. Examples of a suitable alkoxylated castor oil include, but are not limited to Stepantex® CO-40 (40 EO), Toximul® 8242, both available from Stepan Chemical Company, and Cirrasol™ G-1292 (25 EO) available from Croda Inc. Additional non-limiting examples include Toximul® 8243 and Toximul® 8244. Other suitable examples may include Emulpon CO-550, CO-360, CO-200 from AkzoNobel Nouryon and Surfom R 360 and R 540 from Oxiteno.

Additionally or alternatively, the emulsifying agent may be an alkoxylated fatty acid ester. Non-limiting examples of such esters include ethoxylated methyl esters of fatty acids, such as commercially available Agnique® ME 818-5. Other suitable examples may include Break-Thru® EM V20.

D. Monocarboxylic Acid/Monocarboxylate Component

"Monocarboxylic acid" refers to a hydrocarbon or substituted hydrocarbon containing only one carboxy functional group (i.e., $R^1$—C(O)OH). "Monocarboxylate" refers to a salt (i.e., $R^1$—C(O)OM wherein M is an agriculturally acceptable cation). In one embodiment, the composition comprises at least one monocarboxylate salt, which in aqueous compositions may be present, in whole or in part, in dissociated form as a monocarboxylate anion and the corresponding cation.

Representative monocarboxylic acids and monocarboxylates generally comprise a hydrocarbon or unsubstituted hydrocarbon selected from, for example, unsubstituted or substituted, straight or branched chain alkyl (e.g., $C_1$-$C_{20}$ alkyl such as methyl, ethyl, n-propyl, isopropyl, etc.); unsubstituted or substituted, straight or branched chain alkenyl (e.g., $C_2$-$C_{20}$ alkyl such as ethenyl, n-propenyl, isopropenyl, etc.); unsubstituted or substituted aryl (e.g., phenyl, hydroxyphenyl, etc.); or unsubstituted or substituted arylalkyl (e.g., benzyl). In one embodiment, the monocarboxylic acid is selected from the group consisting of formic acid, acetic acid, propionic acid, and benzoic acid. In another embodiment, the monocarboxylate salt is selected from the group consisting of formate salts, acetate salts, propionate salts, and benzoate salts.

In one embodiment, the herbicidal composition comprises a monocarboxylate salt having the formula $R^1$—C(O)OM, wherein $R^1$ is unsubstituted or substituted $C_1$-$C_{10}$ alkyl and M is a non-amine, agriculturally acceptable cation. In another embodiment, the herbicidal composition comprises a monocarboxylate salt having the formula $R^1$—C(O)OM, wherein $R^1$ is unsubstituted $C_1$-$C_6$ alkyl and M is an alkali metal salt. In another embodiment, the herbicidal composition comprises a monocarboxylate salt having the formula $R^1$—C(O)OM, wherein $R^1$ is unsubstituted $C_1$-$C_3$alkyl and M is an alkali metal salt selected from sodium and potassium. In another embodiment, the monocarboxylate salt is potassium acetate. In another embodiment, the monocarboxylate salt is sodium acetate.

In any embodiment, the herbicidal composition concentrates described herein can have a pH that is preferably equal to or higher than the acid dissociation constant (pKa) of the monocarboxylic acid, if present in the composition. For example, the herbicidal composition concentrates can include acetic acid (which has a pKa of about 4.8) and have a pH equal to or greater than about 4.8.

E. Alkali Metal Phosphate/Alkali Metal Carbonate

The herbicidal composition concentrates optionally may further include an alkali metal phosphate such as dipotassium phosphate. Dipotassium phosphate, for example, can provide additional buffering and/or water-conditioning for aqueous herbicidal compositions of the present invention. Dipotassium phosphate is particularly effective as a replacement for ammonium sulfate in herbicidal composition application mixtures prepared using hard water.

Additionally or alternatively, the herbicidal composition concentrates optionally may further include an alkali metal carbonate, such as potassium carbonate, to provide additional buffering and/or water-conditioning for aqueous herbicidal compositions of the present invention.

F. Non-Herbicide Additives

The herbicidal composition concentrates optionally may further include conventional additives, such as further surfactants, safeners, solubility enhancing agents, thickening agents, flow enhancers, foam-moderating agents, freeze protectants, UV protectants, preservatives, antimicrobials, and/or other additives that are necessary or desirable to improve the performance, crop safety, or handling of the composition.

In any embodiment, the herbicidal composition concentrate can include less than about ppm of ammonium sulfate. In another embodiment, the herbicidal composition concentrate does not include ammonium sulfate.

In any embodiment, the herbicidal composition concentrate does not include an acid other than a monocarboxylic acid.

G. Further Herbicide Components

The herbicidal composition concentrates optionally may include at least one further herbicide. Representative examples of a further herbicide include, but are not limited to hydroxyphenylpyruvate dioxygenase (HPPD) inhibitors, acetyl-CoA carboxylase (ACCase) inhibitors, acetolactate synthase (ALS) inhibitors, acetohydroxy acid synthase (AHAS) inhibitors, photosystem II (PS II) inhibitors, photosystem I (PS I) inhibitors, protoporphyrinogen oxidase (PPO or Protox) inhibitors, carotenoid biosynthesis inhibitors, enolpyruvyl shikimate-3-phosphate (EPSP) synthase inhibitor, glutamine synthetase inhibitor, dihydropteroate synthetase inhibitor, mitosis inhibitors, nucleic acid inhibitors, cellulose inhibitors, oxidative phosphorylation uncouplers, dihydropteroate synthase inhibitors, fatty acid and lipid biosynthesis inhibitors, auxin transport inhibitors, salts and esters thereof, racemic mixtures and resolved isomers thereof, and mixtures thereof; salts and esters thereof; racemic mixtures and resolved isomers thereof; and combinations thereof.

Application mixtures can be prepared by diluting aqueous herbicidal concentrate compositions as described herein. Additional herbicides can be "tank mixed" with the application mixtures prepared from the aqueous herbicidal concentrate compositions described herein.

Examples of herbicides within these classes of further herbicides are provided below. Where an herbicide is referenced generically herein by name, unless otherwise restricted, that herbicide includes all commercially available forms known in the art such as salts, esters, free acids and free bases, as well as stereoisomers thereof.

Representative examples of HPPD inhibitors include, but are not limited to aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, topramezone, tolpyralate, tefuryltrione, salts and esters thereof, and mixtures thereof.

Representative examples of ACCase inhibitors include, but are not limited to alloxydim, butroxydim, clethodim, cycloxydim, pinoxaden, sethoxydim, tepraloxydim and tralkoxydim, salts and esters thereof, and mixtures thereof. Another group of ACCase inhibitors include chlorazifop, clodinafop, clofop, cyhalofop, diclofop, diclofop-methyl, fenoxaprop, fenthiaprop, fluazifop, haloxyfop, isoxapyrifop, metamifop, propaquizafop, quizalofop and trifop, salts and esters thereof, and mixtures thereof. ACCase inhibitors also include mixtures of one or more "dims" and one or more "fops", salts and esters thereof.

Representative examples of ALS or AHAS inhibitors include, but are not limited to amidosulfuron, azimsulfruon, bensulfuron-methyl, bispyribac-sodium, chlorimuron-ethyl, chlorsulfuron, cinosulfuron, cloransulam-methyl, cyclosulfamuron, diclosulam, ethametsulfuron-methyl, ethoxysulfuron, flazasulfuron, florazulam, flucarbazone, flucetosulfuron, flumetsulam, flupyrsulfuron-methyl, foramsulfuron, halosulfuron-methyl, imazamethabenz, imazamox, imazapic, imazapyr, imazaquin, imazethapyr, imazosulfuron, iodosulfuron, metsulfuron-methyl, nicosulfuron, penoxsulam, primisulfuron-methyl, propoxycarbazone-sodium, prosulfuron, pyrazosulfuron-ethyl, pyribenzoxim, pyrithiobac, rimsulfuron, sulfometuron-methyl, sulfosulfuron, thiencarbazone, thifensulfuron-methyl, triasulfuron, tribenuron-methyl, trifloxysulfuron and triflusulfuron-methyl, salts and esters thereof, and mixtures thereof.

Representative examples of photosystem I inhibitors include, but are not limited to diquat and paraquat, salts and esters thereof, and mixtures thereof. Representative examples of photosystem II inhibitors include, but are not limited to ametryn, amicarbazone, atrazine, bentazon, bromacil, bromoxynil, chlorotoluron, cyanazine, desmedipham, desmetryn, dimefuron, diuron, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, salts and esters thereof, and mixtures thereof.

Representative examples of PPO inhibitors include, but are not limited to Diphenylethers (acifluorfen-sodium, bifenox, chlomethoxyfen, chlornitrofen, ethoxyfen-ethyl, fluoroglycofen-ethyl, fomesafen, lactofen, oxyfluorfen), N-phenylphthalimides (cinidon-ethyl, fumiclorac, flumiclorac-pentyl, flumioxazin), oxadiazoles (oxadiargyl, oxadiazon), oxazolidinediones (pentoxazone), phenylpyrazoles (fluazolate, pyraflufen-ethyl), pyrimidindiones (benzfendizone, butafenacil, saflufenacil, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate), thiadiazoles (fluthiacet-methyl, thidiazimin), triazinone (trifludimoxazin), triazolinones (azafenidin, carfentrazone-ethyl, sulfentrazone) and others (flufenpyr-ethyl, profluazol, pyraclonil).

Representative examples of carotenoid biosynthesis inhibitors include, but are not limited to aclonifen, amitrole, diflufenican, mesotrione, and sulcotrione.

A representative example of an EPSP inhibitor includes, but is not limited to N-phosphonomethyl glycine (glyphosate).

A representative example of a glutamine synthetase inhibitor includes, but is not limited to glufosinate.

A representative example of a dihydropteroate synthetase inhibitor includes, but is not limited to asulam.

Representative examples of mitosis inhibitors include, but are not limited to acetochlor, alachlor, dithiopyr, S-metolachlor, and thiazopyr.

Representative examples of nucleic acid inhibitors include, but are not limited to difenzoquat, fosamine, metham, and pelargonic acid.

In any embodiment, the herbicidal composition concentrate further includes a further herbicide selected from the group consisting of acetochlor, glyphosate, glufosinate, flumioxazin, fomesafen, and agriculturally acceptable salts thereof.

In one embodiment, the herbicidal composition concentrate further includes glyphosate, or an agriculturally acceptable salt thereof. Suitable glyphosate salts include, for example, the ammonium, diammonium, dimethylammonium, monoethanolamine, isopropylamine, and potassium salts, and combinations thereof. In any embodiment, the glyphosate salts are selected from the group consisting of monoethanolamine, isopropylamine, and potassium salts, and combinations thereof.

In any embodiment, the herbicidal composition concentrate further includes glufosinate, or an agriculturally acceptable salt thereof.

In any embodiment, the herbicidal composition concentrate includes dicamba, or an agriculturally acceptable salt or ester thereof, and glyphosate, or an agriculturally acceptable salt thereof. Additionally or alternatively, the herbicidal composition concentrate includes dicamba, or an agriculturally acceptable salt thereof; glyphosate, or an agriculturally acceptable salt thereof; and a non-amine, agriculturally acceptable acetate salt. Commercially available sources of glyphosate, and its agriculturally acceptable salts, include those products sold under the trade names DURANGO® DMA®, HONCHO PLUS®, ROUNDUP POWERMAX®, ROUNDUP WEATHERMAX®, TRAXION®, and TOUCHDOWN®.

Additionally or alternatively, the herbicidal composition concentrate includes 2,4-D, or an agriculturally acceptable salt or ester thereof, and glyphosate, or an agriculturally acceptable salt thereof. Additionally or alternatively, the herbicidal composition concentrate includes 2,4-D, or an agriculturally acceptable salt or ester thereof; glyphosate, or an agriculturally acceptable salt thereof; and a non-amine, agriculturally acceptable acetate salt.

In any embodiment, the herbicidal composition concentrate includes dicamba, or an agriculturally acceptable salt or ester thereof, and glufosinate, or an agriculturally acceptable salt thereof. Additionally or alternatively, the herbicidal composition concentrate includes 2,4-D, or an agriculturally acceptable salt or ester thereof, and glufosinate, or an agriculturally acceptable salt thereof.

In any embodiment, the herbicidal composition concentrate includes an agriculturally acceptable non-auxin herbicide salt (such as a glyphosate salt) that is an ionic liquid as described in published application US2013/0109572, i.e., a salt that is a liquid at a temperature at or below about 150° C.

H. Component Loading

1. Herbicide Loading:

The herbicidal composition concentrate described herein can be diluted with water prior to application. Concentrated herbicidal compositions as described herein typically can include on an acid equivalent basis (a.e. or ae), for example, from about 120 to about 600 g a.e./L, from about 300 to about 600 g a.e./L, from about 350 to about 600 g a.e./L, from about 400 to about 600 g a.e./L, from about 450 to about 600 g a.e./L, or from about 500 to about 600 g a.e./L total herbicide loading. As used herein, the term "total herbicide loading" encompasses a herbicide loading when only one herbicide is present in the composition, for example, one auxin herbicide or one non-auxin herbicide, as well as the total when one or more herbicides are present, for example, two auxin herbicides or an auxin herbicide and a non-auxin herbicide. Additional examples of representative total herbicide loading include about 120, 150, 200, 250, 300, 350, 400, 450, 500, 550, and 600 g a.e./L, and ranges thereof (i.e., from about 120 to about 150 g a.e./L, from about 150 to about 200 g a.e./L, from about 200 to about 250 g a.e./L, from about 250 to about 300 g a.e./L, from about 300 to about 350 g a.e./L, from about 350 to about 400 g a.e./L from about 400 to about 450 g a.e./L, from about 450 to about 500 g a.e./L, from about 500 to about 550 g a.e./L, from about 550 to about 600 g a.e./L total herbicide loading).

In any embodiment, the herbicidal composition can be a liquid concentrate containing, for example, a total amount (acid equivalent weight) of herbicide, by weight of the composition concentrate, of greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, or about 70%. Additionally or alternatively, the herbicidal composition is a liquid concentrate containing, for example, a total amount (acid equivalent weight) of herbicide, by weight of the composition concentrate, from about 5% to about 70%, about 5% to about 60%, about 5% to about 50%, about 10% to about 40%, about 10% to about 30%, or about or about 10% to about 20%.

In herbicidal compositions concentrates including an auxin herbicide and a non-auxin herbicide, the weight ratio on an acid equivalent basis of the auxin herbicide to the non-auxin herbicide is typically no greater than about 50:1, for example, about 50:1, 25:1, 10:1, 5:1, 3:1, 2:1, 1:1, 1:2, 1:3, 1:5, about 1:10, or ranges thereof such as from about 50:1 to about 1:10, from about to about 1:5, from about 50:1 to about 1:1, from about 50:1 to about 3:1, from about 50:1 to about 5:1, from about 50:1 to about 10:1, from about 25:1 to about 1:1, or from about 25:1 to about 3:1.

In a particular embodiment, the herbicidal composition concentrate can include an auxin herbicide in an amount (acid equivalent weight), by weight of the composition concentrate, of about 5% to about 70%, about 5% to about 60%, about 5% to about 50%, about 10% to about 40%, about 10% to about 30%, or about or about 10% to about 20%, and non-auxin herbicide in an amount (acid equivalent weight), by weight of the composition concentrate, of about 10% to about 70%, about 15% to about 60%, about 15% to about 50%, or about 20% to about 40%.

For any given auxin herbicide, one skilled in the art can readily determine using routine experimentation a minimum concentration of auxin herbicide and a minimum ratio of auxin herbicide to any additional auxin herbicides and/or non-auxin herbicides contained in the herbicidal composition that is desirable for the intended application.

2. Drift Retardant Agent (DRA) Loading:

In any embodiment, the at least one DRA as described herein may be present in the composition concentrate, by weight of the composition concentrate, in a total DRA loading of greater than or equal to about 1%, greater than or equal to about 2%, greater than or equal to about 5%, greater than or equal to about 8%, greater than or equal to about 10%, greater than or equal to about 12%, greater than or equal to about 15%, or about 20%. As used herein, the term "total DRA loading" encompasses a DRA loading when only one DRA is present in the composition as well as the total when one or more DRAs are present. Additionally or alternatively, the at least one DRA may be present in the composition concentrate, by weight of the composition concentrate, in a total DRA loading of about 1% to about 20%, about 1% to about 15%, about 2% to about 12%, about 2% to about 10%, or about or about 5% to about 10%.

3. Emulsifying Agent Total Loading

In any embodiment, the emulsifying agent as described herein may be present in the composition concentrate, by weight of the composition concentrate, in a total emulsifying agent loading of greater than or equal to about 1 wt. %, greater than or equal to about 2 wt. %, greater than or equal to about 3 wt. %, greater than or equal to about 4 wt. %, greater than or equal to about wt. %, greater than or equal to about 6 wt. %, greater than or equal to about 7 wt. %, greater than or equal to about 8 wt. %, greater than or equal to about 9 wt. %, greater than or equal to about 10 wt. %, greater than or equal to about 12 wt. %, greater than or equal to about 15 wt. %, greater than or equal to about 20 wt. %, greater than or equal to about 25 wt. %, greater than or equal to about wt. %, or about 30 wt. %. As used herein, the term "total emulsifying agent loading" encompasses a emulsifying agent loading when only one emulsifying agent is present in the composition as well as the total when one or more emulsifying agents are present. Additionally or alternatively, the emulsifying agent may be present in the composition concentrate, by weight of the composition concentrate, in a total emulsifying agent loading of about 1 wt. % to about 30% wt. %, about 1 wt. % to about 25% wt. %, about 2 wt. % to about 25 wt. %, about 3 wt. % to about 25 wt. %, about 4 wt. % to about 25 wt. %, about 5 wt. % to about 25 wt. %, about 5 wt. % to about 20 wt. %, about 10 wt. % to about 20 wt. %, about 15 wt. % to about 20 wt. %, or about 10 wt. % to about wt. %.

4. Monocarboxylic Acid/Monocarboxylate Loading:

In any embodiment, the herbicidal composition concentrate may include a single monocarboxylic acid, or monocarboxylate thereof, or a mixture of two or more monocarboxylic acids, or monocarboxylates thereof.

In various embodiments, the concentration of volatilized auxin herbicide in the vapor phase surrounding a herbicidal composition comprising an auxin herbicide and a monocarboxylic acid, or monocarboxylate thereof, is less than about 90%, 80%, 70%, 60%, 50%, 40%, 30%, 20%, 10%, or 5% of the concentration of volatilized auxin herbicide in the vapor phase surrounding the reference composition lacking the monocarboxylate.

The monocarboxylic acid or monocarboxylate loading of the herbicidal composition generally can depend upon the auxin herbicide loading of the herbicidal composition, the salt form of the auxin herbicide, and the properties of any other components of the herbicidal composition, and will be an amount sufficient to reduce the volatility of the auxin herbicide relative to a reference composition lacking the monocarboxylic acid or monocarboxylate, but otherwise having the same composition. For example, the monoethanolamine and diglycolamine salts of dicamba are less volatile than the dimethylamine and isopropylamine salts of dicamba and the loading required for the less volatile salts may be less than the loading required for the more volatile salts. In addition, the loading of the monocarboxylic acid, or monocarboxylate thereof, can vary with the specific combination of auxin herbicide, optional non-auxin herbicide, and monocarboxylic acid, or monocarboxylate thereof.

In the herbicidal composition concentrates described herein, the molar ratio of the auxin herbicide to the monocarboxylic acid, or monocarboxylate thereof, is typically no less than about 1:10 and no greater than about 10:1. Representative molar ratios of auxin herbicide acid equivalent (a.e.) to total monocarboxylic acid, or monocarboxylate thereof, are, for example, from 1:10 to about 10:1, from about 3:10 to about 10:1, from about 1:5 to about 5:1, and from about 3:1 to about 1:3. In any embodiment, the molar ratio of auxin herbicide to monocarboxylic acid, or monocarboxylate thereof, is about 2:1 to about 1:2. In any embodiment, the molar ratio of auxin herbicide to monocarboxylic acid, or monocarboxylate thereof, is about 1:1.

In any embodiment, the herbicidal composition concentrates can contain an amount (acid equivalent weight) of the monocarboxylic acid, or monocarboxylate thereof, by weight of the concentrate, from about 0.25% to about 35%, about 5% to about 30%, or about 5% to about 20%.

5. Alkali Metal Phosphate/Alkali Metal Carbonate Loading

When the herbicidal composition concentrate includes an alkali metal phosphate, such as dipotassium phosphate, the molar ratio of the alkali metal phosphate to the monocarboxylic acid, or monocarboxylate thereof, can range, for example, from about 1:5 to about 5:1, from about 3:1 to about 1:3, or from about 2:1 to about 1:2. In any embodiment, the molar ratio of alkali metal phosphate to monocarboxylic acid, or monocarboxylate thereof, is about 1:1.

When the herbicidal composition concentrate includes an alkali metal carbonate, such as potassium carbonate, the molar ratio of the alkali metal carbonate to the monocarboxylic acid, or monocarboxylate thereof, can range, for example, from about 1:5 to about 5:1, from about 3:1 to about 1:3, or from about 2:1 to about 1:2. In any embodiment, the molar ratio of alkali metal carbonate to monocarboxylic acid, or monocarboxylate thereof, is about 1:1.

I. Methods of Making an Herbicidal Composition Concentrate

Methods of making herbicidal composition concentrate as described herein are also provided. The herbicidal composition concentrate formed can be an emulsion or a microemulsion. The method may include admixing at least one auxin herbicide as described herein with at least one drift retardant agent (DRA) as described herein and an emulsifying agent as described herein to form the herbicidal composition concentrate. For example, the DRA can include soybean oil or a methyl ester of soybean oil, poly(oxy-1,2-ethanediyl), α-[(9Z)-1-oxo-9-octadecen-1-yl]-ω-hydroxy-, and octadecanoic acid, 12-hydroxy-, homopolymer, ester with α, α', α"-1,2,3-propanetriyltris[ω-hydroxypoly(oxy-1,2-ethanediyl)]. The DRA can include soybean oil or a methyl ester of soybean oil in an amount of about 80% to about 95% by weight of the DRA, poly(oxy-1,2-ethanediyl), α-[(9Z)-1-oxo-9-octadecen-1-yl]-ω-hydroxy- in an amount of about 0.25% to about 10% by weight of the DRA, and octadecanoic acid, 12-hydroxy-, homopolymer, ester with α, α', α"-1,2,3-propanetriyltris[ω-hydroxypoly(oxy-1,2-ethanediyl)] in an amount of about 3% to about 50% by weight of the DRA.

The emulsifying agent can be selected from the group consisting of a phosphate ester, an alkylpolysaccharide, an alkoxylated castor oil, and a combination thereof. For example, the at least one auxin herbicide can be selected from the group consisting of dicamba, an agriculturally acceptable salt of dicamba (e.g., N,N-[aminopropyl]methylamine, monoethanolamine, dimethylamine, isopropylamine, diglycolamine, a potassium salt, and a sodium salt, and a combination thereof), an agriculturally acceptable ester of dicamba, 2,4-D, an agriculturally acceptable salt of 2,4-D, an agriculturally acceptable ester of 2,4-D, and a combination thereof.

The total herbicide loading of the composition concentrate can be as described herein, for example, an amount (acid equivalent weight) of about 5% to about 50% by weight of the composition concentrate. The total DRA loading of the composition concentrate can be as described herein, for example, an amount of about 2% to about 10% by weight of the composition concentrate. The total emulsifying agent loading of the composition concentrate can be as described herein, for example, an amount of about 1% to about 20% by weight of the composition concentrate.

In any embodiment, the method may further include admixing the at least auxin herbicide with water to form an aqueous solution prior to admixing with the at least one drift retardant agent and the emulsifying agent. Additionally or alternatively, the method may further include admixing at least one monocarboxylic acid (e.g., acetic acid) or a monocarboxylate thereof (e.g., potassium acetate) with the at least one auxin herbicide, the at least one drift retardant agent, and the emulsifying agent. In any embodiment, the herbicidal composition concentrate can contain an amount (acid equivalent weight) of the monocarboxylic acid, or monocarboxylate thereof, by weight of the concentrate, as described herein, for example, about 5% to about 30% and/or a molar ratio of the at least one monocarboxylic acid or the monocarboxylate thereof to the auxin herbicide as described herein, for example, from about 1:10 to about 10:1.

Additionally or alternatively, the method may further comprise mixing at least one further herbicide (e.g., glyphosate, an agriculturally acceptable salt of glyphosate, glufosinate, an agriculturally acceptable salt of glufosinate, and a combination thereof) with the at least one auxin herbicide, the at least one DRA, and the emulsifying agent. Optionally, an antifoam agent may be added to suppress formation of foam while mixing. A suitable antifoam agent includes, but is not limited to a silicone antifoam agent, for example, SAG 1572 available from Momentive. The further herbicide can be present in the herbicidal composition concentrate in an amount (acid equivalent weight) as described herein, for example, about 15% to about 60% by weight of the composition.

J. Drift Retardant Agent (DRA) Composition

A drift retardant agent (DRA) composition for use in the preparation of an herbicidal application mixture is also provided herein. The DRA composition can include at least one DRA as described herein. and an emulsifying agent as described herein. For example, the DRA can include soybean oil or a methyl ester of soybean oil, poly(oxy-1,2-ethanediyl), α-[(9Z)-1-oxo-9-octadecen-1-yl]-ω-hydroxy-, and octadecanoic acid, 12-hydroxy-, homopolymer, ester with α, α', α"-1,2,3-propanetriyltris[ω-hydroxypoly(oxy-1,2-ethanediyl)]. The emulsifying agent can be, for example, a phosphate ester, an alkylpolysaccharide, an alkoxylated castor oil, or a combination thereof. It is contemplated herein that this DRA composition can be admixed with further components, such as the herbicides described herein and/or the monocarboxylic acid/monocarboxylates as described herein and/or water to form an application mixture.

Having described the invention in detail, it will be apparent that modifications and variations are possible without departing from the scope of the invention defined in the appended claims.

EXAMPLES

The following non-limiting examples are provided to further illustrate the present invention. It should be noted that the composition examples below are presented on the basis of the components initially combined to form the reported tank mix or concentrate. The various embodiments of the present invention are intended to encompass such initial compositions as well as any corresponding compositions resulting from interaction among the components once combined, such as where a monocarboxylic acid salt is formed in situ by combining a monocarboxylic acid with a neutralizing base.

Unless otherwise indicated 2601 used in the below examples includes:
  soybean oil (CAS Registry Number 8001-22-7) in a range of 80% to 95% by weight;
  poly(oxy-1,2-ethanediyl), α-[(9Z)-1-oxo-9-octadecen-1-yl]-ω-hydroxy- (CAS Registry Number 9004-96-0) in a range of 0.25% to 10% by weight; and
  octadecanoic acid, 12-hydroxy-, homopolymer, ester with α, α', α"-1,2,3-propanetriyltris[ω-hydroxypoly(oxy-1,2-ethanediyl)] (CAS Registry Number 1939051-18-9) in a range of 3% to 50% by weight.

Unless otherwise indicated 2602 used in the below examples includes:
- methyl ester of soybean oil (CAS Registry Number 67784-80-9) in a range of 80% to 95% by weight;
- poly(oxy-1,2-ethanediyl), α-[(9Z)-1-oxo-9-octadecen-1-yl]-ω-hydroxy- (CAS Registry Number 9004-96-0) in a range of 0.25% to 10% by weight; and
- octadecanoic acid, 12-hydroxy-, homopolymer, ester with α, α', α"-1,2,3-propanetriyltris[ω-hydroxypoly(oxy-1,2-ethanediyl)] (CAS Registry Number 1939051-18-9) in a range of 3% to 50% by weight.

Example 1—Dicamba and 2,4-D Straight-Goods Compositions Without Vaporgrip™

Drift retardant formulations shown in Table 1 were prepared. All the components were combined in a beaker with magnetic stirring. Monoethanolamine (MEA) was added to neutralize the phosphate esters in dicamba formulations.

TABLE 1

Auxin Straight-Goods Formulations without Vaporgrip ™

| Formulation 1-1 (26.5% dicamba a.e.) | | Formulation 1-2 (9.3% dicamba a.e.) | | Formulation 1-3 (37.5% 2,4-D a.e.) | |
|---|---|---|---|---|---|
| Dicamba (Xtendimax) | 234 g | Dicamba (Xtend) | 831 g | 2,4-D DMA 2602 | 334 g |
| 2601 | 16 g | 2602 | 19 g | | 16 g |
| Crodafos SG | 5 g | Tryfac 5560-A | 25 g | | |
| MEA | 1 g | MEA | 4 g | | |

Figure 1B:
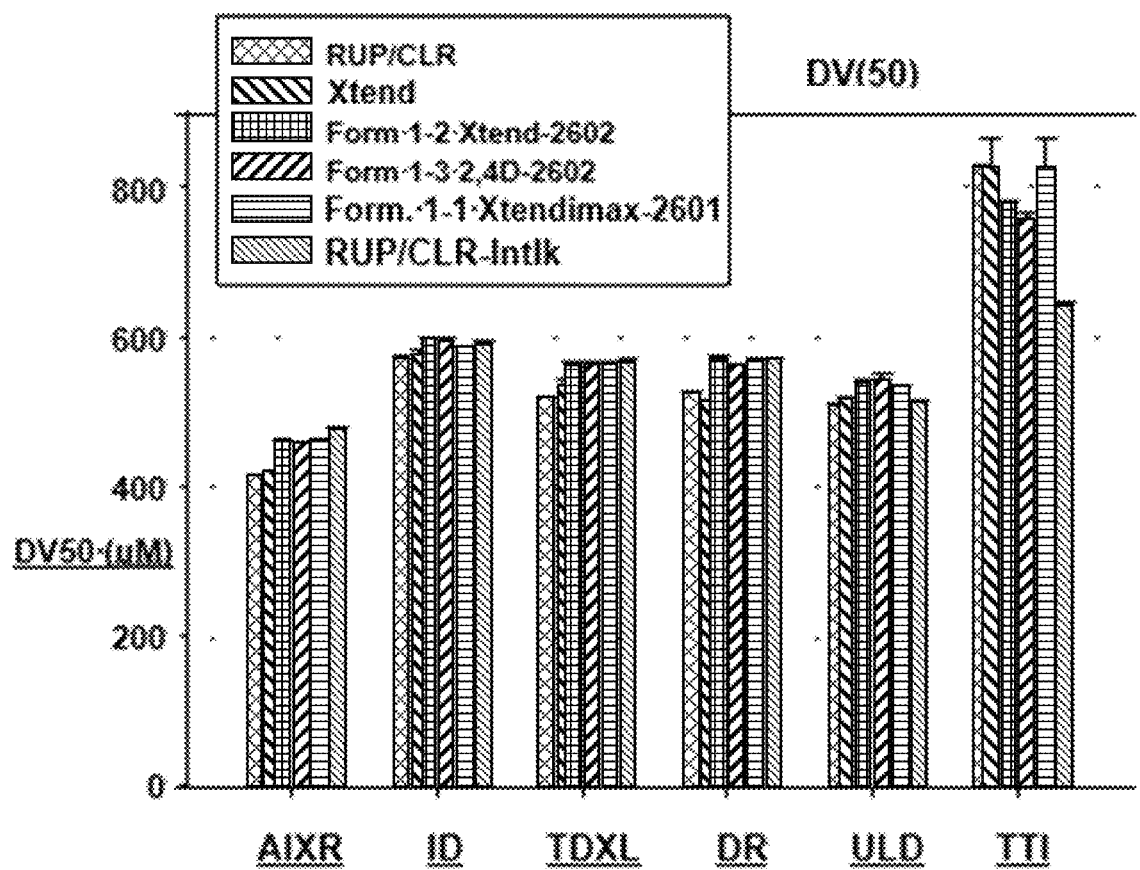

Spray particle sizes studies were conducted for these formulations, all of which had drift retardant concentrations which provided 2 oz/ac rates in the spray tank (FIGS. 1A-B). All data collected is for 1120/560 g/ha ae at 10 gallons (37.8541 liter) per acre (ac, 0.404686 ha). Particle size data is from the Q164 Spray Particle Size Facility on six '05 nozzles at 40 psi. Formulation 1-3 and Formulation 1-1 built-in formulations were tank-mixed with Roundup Powermax®. All tank mixtures were prepared to deliver 560/1120 g/ha ae dicamba/glyphosate at 10 gallons/acre.

It was found that on most nozzles, 2 oz/ac 2601 built into Formulation 1-1 tank-mixed with Roundup Powermax®, provides suppression of driftable fines (volume %<150 μm) that is equivalent to the high rate of Interlock®. The Wilger DR 11005 and Greenleaf TDXL 11005 nozzles used with Formulation 1-1 at 40 psi provide fines as low as the TTI 11005 nozzle at the same pressure with Xtendimax/Powermax®. At 2 oz/ac, 2602 also provides significant reductions in driftable fines, but 2601 is somewhat more effective at this rate. Unlike polymeric drift agents, the emulsion drift agents have little effect on the volume-weighted average particle size Dv50 (also known as VMD).

Example 2—Compositions with TEA Salt of 2,4-D and DRAs

Conventional emulsions of drift retardants in TEA salt of 2,4-D were developed based on a 39.4% a.e. solution of the salt, TEA, 2,4-D, as shown in Table 2 below. Three formulations were developed which showed good physical stability.

TABLE 2

2,4-D TEA Compositions with DRAs

| Components | Composition 2-1, 34.1% a.e. | Composition 2-2, 36.5% a.e. | Composition 2-3, 36.0% a.e. |
|---|---|---|---|
| TEA, 2,4-D | 88.2% | 94.2% | 93% |
| 2601 | 4.8% | — | — |
| 2602 | — | 4.8% | — |
| Steposol ME | — | — | 5% |
| Break-thru DA 647 | 2% | — | — |
| Water | 5% | — | — |
| Toximul 8242 | — | 1% | 2% |

Example 3—Dicamba Straight-Goods Compositions with Vaporgrip™

Compositions 3-1 and 3-2 were prepared (Table 3) from dicamba stock solution which was combined with drift retardant followed by addition of dispersants and the mixture was agitated at 10 krpm for about 15 seconds with a turrax high-shear mixer.

TABLE 3

Dicamba Compositions with DRA and Vaporgrip ™

| Components | Composition 3-1 | Composition 3-2 |
|---|---|---|
| Dicamba stock solution (MEA dicamba, 55% ae) | 46.6% | 53.6% |
| Acetic acid | 5.3% | 8.2% |
| Potassium hydroxide, 45% wt/wt | 8.9% | 12.7% |
| 2601 | 6.0% | 6.2% |
| Crodafos T6A | 2.0% | 2.1% |
| Agnique PG 8105 | 1.0% | 1.05% |
| SAG 1572 | 0.01% | — |
| Deionized water | 30.2% | 16.3% |
| | 26.1%- dicamba a.e., pH 5.8, 2.56 lb/gal dicamba a.e. (307 g/L) | 30.0% dicamba a.e, |

TABLE 4

Straight-goods Dicamba Compositions with High-Loading Vaporgrip ™

| Components | Composition 4-1 | Composition 4-2 | Composition 4-3 |
|---|---|---|---|
| Dicamba stock solution (MEA dicamba, 55% ae) | 47.3% | 47.3% | 41.8% |
| Acetic acid | 14.1% | 14.1% | 14.7% |
| 45% wt/wt KOH | 21.9% | 27.8% | 29.0% |
| 2601 | 5.5% | 5.5% | 5.0% |
| Crodafos O3A | — | 0.5% | 0.5% |

TABLE 4-continued Straight-goods Dicamba Compositions with High-Loading Vaporgrip™

| Components | Composition 4-1 | Composition 4-2 | Composition 4-3 |
|---|---|---|---|
| Agnique PG 8105 | 1.0% | 1.4% | 1.4% |
| Fast wetter† | 0.8% SLES | 0.3% A65N | 0.3% A65N |
| Castor ethoxylate* | 0.5% 8241 | 0.8% 8243 | 0.8% 8241 |
| DI water | 8.9% | 2.3% | 6.5% |
| Dicamba ae | 26% | 26% | 23% |

TABLE 5

Comparison of Compositions in Table 4 with Compositions in Table 3

| | Composition 4-1 | Composition 4-2 | Composition 4-3 | Composition 3-2 | Xtendimax |
|---|---|---|---|---|---|
| Counterion | MEA | MEA | MEA | MEA | DGA |
| Dicamba ae | 26% | 26% | 23% | 30% | 29% |
| Dicamba g/L | 319 g/L | 325 g/L | 285 g/L | 360 g/L | 349 g/L |
| Drift retardant, 2601 | 5.5%, 1.69 oz/ac | 5.5%, 1.69 oz/ac | 5.0%, 1.74 oz/ac | 6.2%, 1.65 oz/ac | — |
| Total surfactant | 2.3% | 3.0% | 3.0% | 3.2% | — |
| Acetic acid:dicamba† | 2.0 | 2.0 | 2.4 | 1.0 | 0.75 |
| K-acetate:dicamba† | 1.5 | 1.9 | 2.2 | 0.75 | 0.58 |

Example 4—Humidome Studies

Figure 2B:
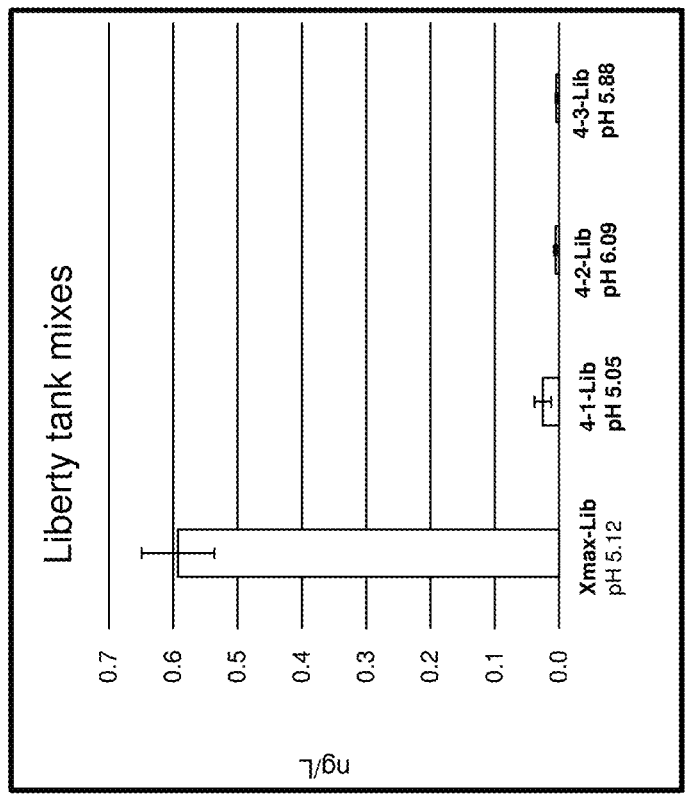
FIGS. 2A and 2B illustrate humidome volatility of Powermax® I and Liberty® tank mixtures, respectively.
Figure 2A:
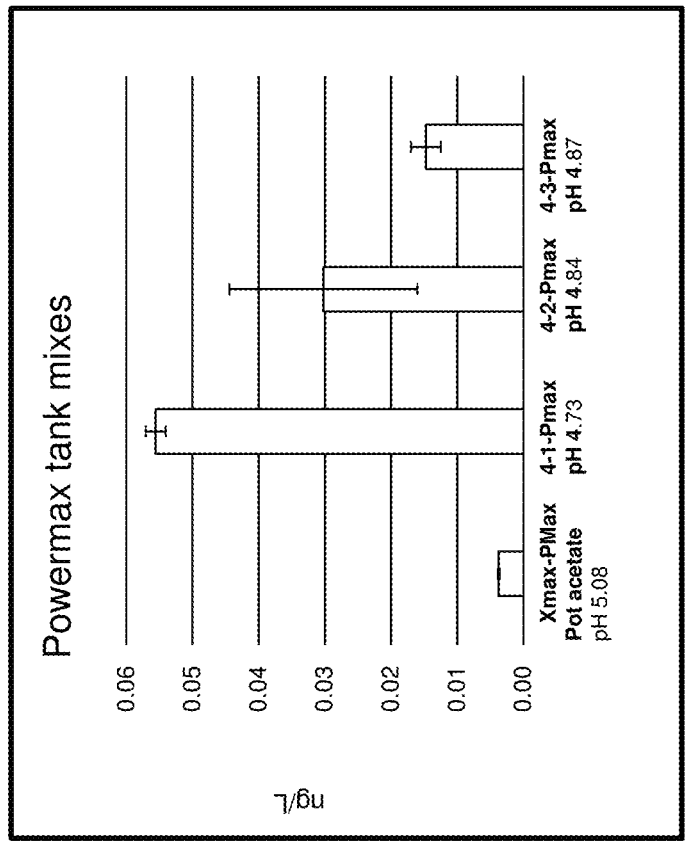
Figure 3:
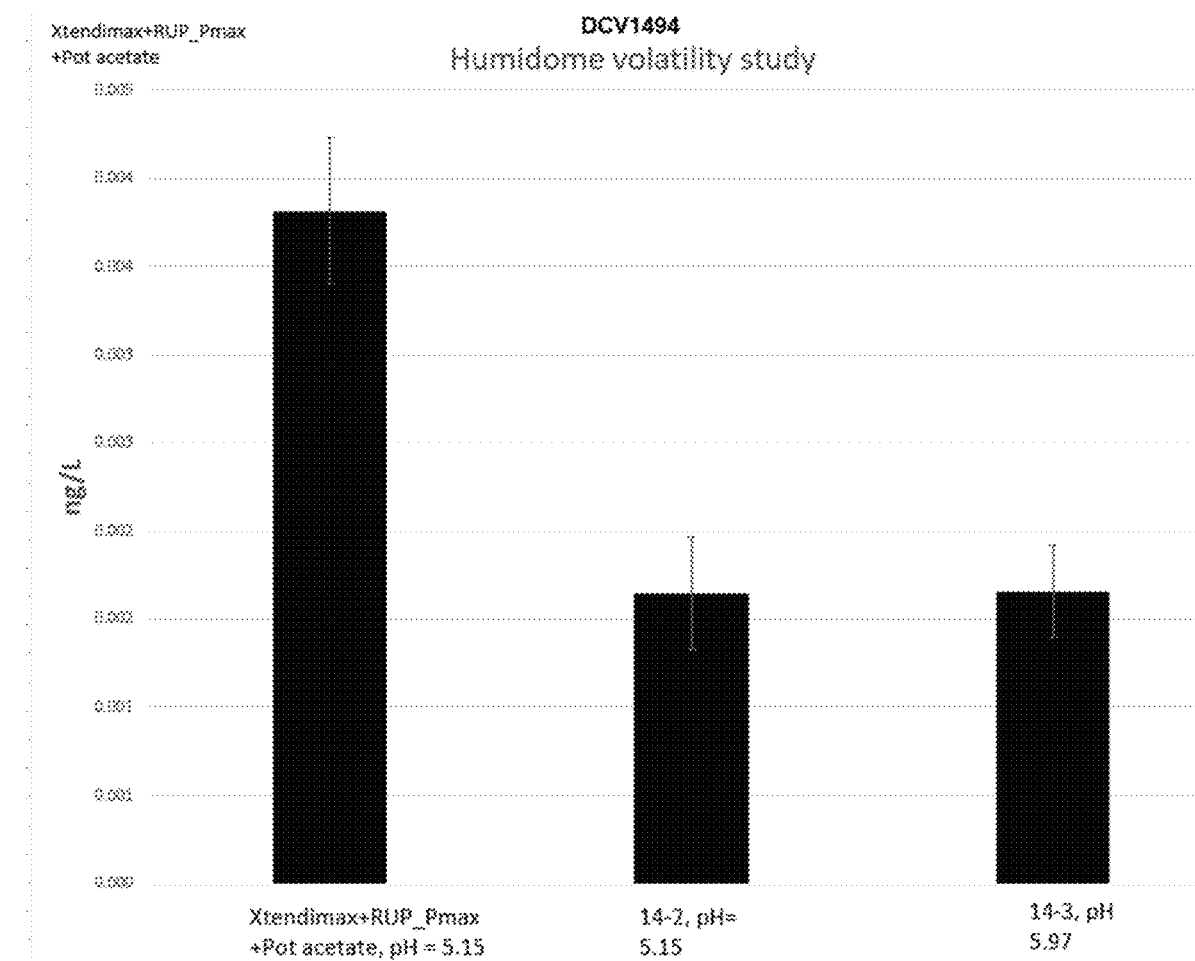
FIG. 3 illustrates humidome volatility for glufosinate and dicamba compositions.
Figure 4:
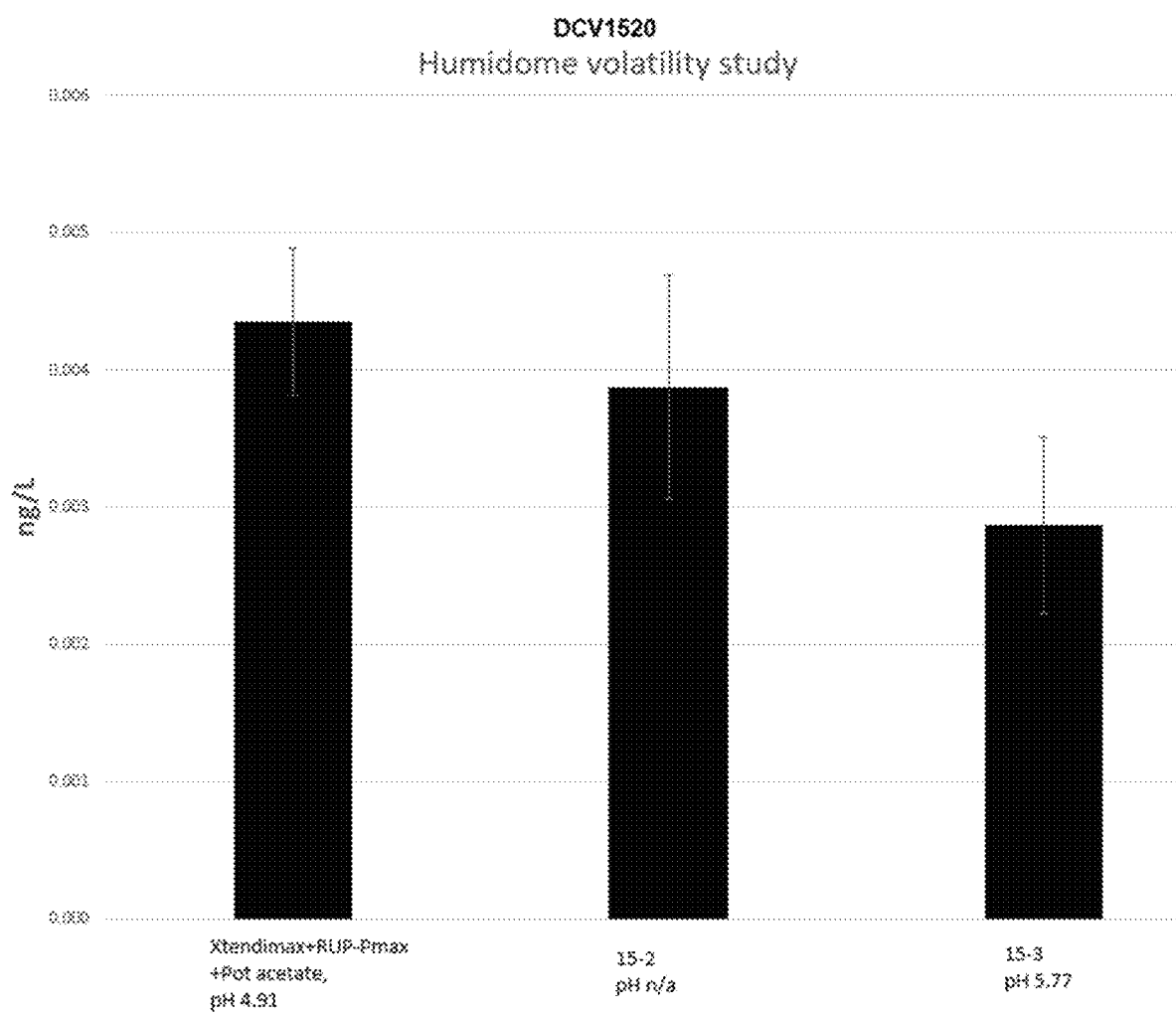
FIG. 4 illustrates humidome volatility for additional glufosinate and dicamba compositions.

Compositions 4-1, 4-2, and 4-3 were submitted for humidome studies as tank mixtures with Roundup Powermax® I and with Liberty®. Xtendimax (Xmax)-Powermax (PMax) with and without a potassium acetate tank-mix adjuvant were used as controls. The new 1⅛ lb glyphosate rate was used with Roundup Powermax® I and the 34-oz rate of Liberty®. The results are shown in Table 6 and FIG. 2A-B. The data in Table 10 shows that the Vaporgrip™ levels in Compositions 4-2 and 4-3 reduce the volatility of high-rate Liberty® tank mixtures to the level of the gold standard Xmax-Pmax-potassium acetate tank mixture. With Powermax® I, neither formulation reaches that level, but both reduce dicamba volatility by roughly an order of magnitude over that typically seen with Xtendimax-Powermax in this assay, 0.2-0.5 ng/L (not run in this experiment).

TABLE 6

Dicamba Volatility, Expressed as an Average Air Concentration over 24-Hour Period

| Tank mix | Dicamba, ng/L |
|---|---|
| Xmax-Pmax-potassium acetate | 0.004 |
| Composition 4-1-Pmax | 0.056 |
| Composition 4-2-Pmax | 0.030 |
| Composition 4-3-PMax | 0.015 |
| Xmax-Liberty | 0.593 |
| Composition 4-1-Liberty | 0.025 |
| Composition 4-2-Liberty | 0.005 |
| Composition 4-3-Liberty | 0.004 |

TABLE 7

Variants of Composition 4-2 with Improved Emulsification

| Component | Composition 4-2 | VM | YM |
|---|---|---|---|
| Dicamba stock solution (MEA dicamba, 55% ae) | 47.3% | 48.3% | 48.3% |
| Acetic Acid, EMD | 14.1% | 14.1% | 14.1% |
| KOH (45% w/w) | 27.8% | 27.8% | 27.8% |
| 2601 | 5.5% | 5.5% | 5.5% |
| Crodafos O3A | 0.5% | 0.5% | 0.5% |

TABLE 7-continued

Variants of Composition 4-2 with Improved Emulsification

| Component | Composition 4-2 | VM | YM |
|---|---|---|---|
| Agnique PG 8105 | 1.4% | 1.5% | 1.5% |
| Fast wetter (Lutensol A65N or Lutensol XL-60) | 0.3% A65N | 0.2% XL60 | 0.2% XL60 |
| Toximul 8241 or 8243 | 0.8% 8243 | 0.5% 8241 | — |
| Pluronic L64 | — | 0.5% | 1.0% |
| DI Water | 2.3% | 1.1% | 1.1% |
| Dicamba ae | 26.0% | 26.6% | 26.6% |

The dicamba straight goods formulations, particularly Composition 4-2, provides excellent control of drift and volatility.

Example 5—Premixes of Dicamba-Glyphosate with Vaporgrip™

Base Formulation 8-1 containing dicamba:acetic acid 1:1.5 mol:mol was prepared for emulsifying drift agents as shown in table below.

TABLE 8

| Formulation 8-1 | |
|---|---|
| MEA dicamba, 56.19% ae | 21.36% (12% ae) |
| MEA glyphosate, 44.8% ae | 53.57% (24% ae) |
| Acetic acid | 4.89% |
| 45% KOH | 7.64% |
| Water | 12.54% |

Example 6—Greenhouse Testing

A series of formulations G05, J03, J05, E05, I05 were prepared by taking components as shown in Table 9 and adding a balance of base Formulation 8-1 shown in Table 8. Greenhouse testing for ELEIN control at half-rate (560-280 g/ha a.e. glyphosate-dicamba) are shown.

TABLE 9

Control of goosegrass (ELEIN) at 560-280 g/ha a.e. glyphosate-dicamba with formulations containing 2602 dispersed with phosphate esters

| Formulation | G05 | J03 | J05 | E05 | I05 | RUP/Xmax | Xtend |
|---|---|---|---|---|---|---|---|
| 2602 | 2.5% | 2.5% | 2.5% | 2.5% | 2.5% | — | — |
| Crodafos | 2% O5 | 2% O3 | 2% O5 | 3% O5 | 4% O5 | — | — |
| PG 264 | — | 1% | 1% | — | — | — | — |
| Water added (Includes 0.5% 50% KOH) | 10% | 5% | 5% | 5% | 10% | — | — |
| ELEIN % control | 59.2% | 74.2% | 74.2% | 67.5% | 75.0% | 96.5% | 98.0% |

Example 7—Preparation of Formulations with Increased Amounts of Surfactant

Formulations with increased levels of Crodafos O5A and Agnique PG 264 were also prepared. A series of formulations '531, '541, '551, '522, '532, '542, '523, '533, '524, '525 were prepared by taking components as shown in Table 10 and adding a balance of base Formulation 8-1 (MEA dicamba, 56.19% ae+MEA glyphosate, 44.8% ae) microemulsified overnight at room temperature and 54° C. with and without 5% water added as shown in table below.

TABLE 10

Formulations with increased Crodafos O5A and Agnique PG 264

| Formulation ID | '531 | '541 | '551 | '522 | '532 | '542 | '523 | '533 | '524 | '525 |
|---|---|---|---|---|---|---|---|---|---|---|
| 2602 | 2.5% | 2.5% | 2.5% | 2.5% | 2.5% | 2.5% | 2.5% | 2.5% | 2.5% | 2.5% |
| Crodafos O5A | 3% | 4% | 5% | 2% | 3% | 4% | 2% | 3% | 2% | 2% |
| Agnique PG 264 | 1% | 1% | 1% | 2% | 2% | 2% | 3% | 3% | 4% | 5% |
| Microemulsion† | ~ | ✓ | ✓ | x | ✓ | ✓ | X | ✓ | x | x |

TABLE 11

Specific gravity and loading of dicamba-glyphosate-Vaporgrip™ formulations

| Formulation | Dicamba wt % a.e. | Glyph. wt % a.e. | Spec. Grav. | Dic. Loading g/L | Dic. Loading lb/gal | Gly. Loading g/L | Gly. Loading lb/gal |
|---|---|---|---|---|---|---|---|
| '541 | 11.10% | 22.20% | 1.2458 | 138.28 | 1.15 | 276.57 | 2.31 |
| '551 | 10.98% | 21.96% | 1.2441 | 136.60 | 1.14 | 273.20 | 2.28 |
| '542 | 10.98% | 21.96% | 1.2441 | 136.60 | 1.14 | 273.20 | 2.28 |
| '533 | 10.98% | 21.96% | 1.2453 | 136.73 | 1.14 | 273.47 | 2.28 |

TABLE 12

Premix formulation '542
Formulation '542, MEA dicamba/MEA
glyphosate, 11.0%/22.0% ae

| | |
|---|---|
| MEA dicamba, 56% a.e. | 19.5% |
| 44.8% a.e. MEA glyphosate | 49.0% |
| Acetic acid | 4.5% |
| 45% KOH | 7.0% |
| 2602 | 2.5% |
| Crodafos O5A | 4.0% |
| Agnique PG 264 | 2.0% |
| Water | 11.5% |

TABLE 13

High-Vaporgrip ™ formulation, Formulations 13-1 and 13-2

| | Formulation 13-1, MEA dicamba/MEA glyphosate, 9.5%/21.7% ae, 3.5:1 Vaporgrip ™:dicamba (mol:mol) | Formulation 13-2, MEA dicamba/MEA glyphosate, 9.5%/21.7% ae, 3:1 Vaporgrip ™:dicamba (mol:mol) |
|---|---|---|
| Dicamba stock solution (MEA dicamba, 55% ae) | 17.3% | 17.27% |
| 45% a.e. MEA glyphosate | 47.6% | 47.59% |
| Acetic acid | 9.0% | 7.74% |
| 45% KOH | 14.2% | 12.11% |
| 2602 | 2.5% | 2.50% |
| Crodafos O5A | 4.1% | 4.10% |
| Agnique PG 264 | 2.1% | 2.05% |
| Fe dopant (4.5% Fe) | 0.41% | 0.41% |
| SAG 1572 | 0.01% | 0.01% |
| 1% FD&C 1 Blue Dye | 0.5% | 0.5% |
| Water | 2.4% | 5.72% |

Table 13 shows Formulation 13-1, which features a 3.5:1 acetic acid:dicamba ratio with 9.5%/21.7% dicamba/glyphosate a.e. includes a dye, an antifoam (SAG 1572) and an iron safener.

Example 8—Premixes of Dicamba-Glufosinate with Vaporgrip™

Ammonium glufosinate was dissolved into water and stirred followed by addition of potassium acetate, stir to dissolve. Added 55% a.e. MEA dicamba together with drift reduction agent 2602 and emulsifier, Crodafos and stirred until homogenous. Added surfactant and stirred for at least 20 minutes.

TABLE 14

Dicamba-glufosinate formulations with Vaporgrip and DRAs

| Ingredients | Formulation 14-1 (wt %) | Formulation 14-2 (wt %) | Formulation 14-3 (wt %) |
|---|---|---|---|
| ammonium glufosinate (100%) | 17.5% | 15.8% | 17.5% |
| Dicamba stock solution (MEA dicamba, 54.58% ae) | 27.17% | 24.45% | 27.17% |
| Potassium acetate | 16.38% | 14.74% | 16.38% |
| 2602 | 5.00% | 4.50% | 5.00% |
| Crodafos O5A | 6.67% | 6.00% | 6.67% |
| Adsee C80W | — | 1.80% | — |
| APG 264 | — | — | 6.00% |
| water | 27.3% | 32.8% | 21.3% |
| Total | 100.0% | 100.0% | 100.0% |
| Glufosinate:Dicamba 1.0625:1, dicamba:VG-1:2.5 total | % active = 32.3% | % active = 29.1% | % active = 32.3% |

TABLE 15

Dicamba-glufosinate formulations with Vaporgrip and DRAs

| Ingredients | 15-6 (wt %) | 15-5 (wt %) | 15-4 (wt %) | 15-3 (wt %) | 15-2 (wt %) | 15-1 (wt %) |
|---|---|---|---|---|---|---|
| ammonium glufosinate (100%) | 17.5% | 15.8% | 17.5% | 17.5% | 15.8% | 17.5% |
| Dicamba stock solution (MEA dicamba, 54.58% ae) | 27.17% | 24.45% | 27.17% | 27.17% | 24.45% | 27.17% |
| Potassium acetate | 16.38% | 14.74% | 16.38% | 16.38% | 14.74% | 16.38% |
| 2602 | 5.00% | 4.50% | 5.00% | 5.00% | 4.50% | 5.00% |
| Crodafos O4A/O3A | 6.67% (O4A) | 6.00% (O4A) | 6.67% (O4A) | 6.67% (O3A) | 6.0% (O3A) | 6.67% (O3A) |
| APG 264 | 6.00% | — | — | 6.0% | — | — |
| Adsee C80W | — | 1.80% | — | — | 1.80% | — |
| water | 21.28% | 32.8% | 27.3% | 21.28% | 32.8% | 27.3% |
| Total | 100% | 100% | 100% | 100% | 100% | 100% |
| Glufosinate:Dicamba 1.0625:1, dicamba: VG-1:2.5 | % active = 32.3% | % active = 29.1% | % active = 32.3% | % active = 32.3% | % active = 29.1% | % active = 32.3% |

TABLE 16

Dicamba-glufosinate formulations with Vaporgrip and drift retardants

| Ingredients | Formulations | | | | |
|---|---|---|---|---|---|
| | 16-1 | 16-2 | 16-3 | 16-4 | 16-5 |
| Ammonium Glufosinate a.i. | 21% | 19.3% | 17.5% | 15.8% | 17.5% |
| MEA Dicamba a.e. | 17.8% | 16.3% | 14.8% | 13.4% | 14.8% |
| KOH | 6.3% | 9.6% | — | — | — |
| AcOH | 7.25% | 11.07% | — | — | — |
| Potassium acetate | — | — | 16.38% | 14.74% | 16.38% |
| Adsee C80W | 4.2% | 3.9% | — | 1.8% | — |
| Crodafos O5A | — | — | 6.7% | 6.0% | 6.7% |
| 2602 | — | — | 5.0% | 4.5% | 5.0% |
| APG 264 | — | — | — | — | 6.0% |

Example 9—Weed Efficacy Studies

A. Premixes of Dicamba-Glyphosate with Vaporgrip™
Greenhouse Study:

The efficacy of Formulations '541, '551, '542 and '533 (see Table 11) vs Powermax/Xtendimax and 1st-generation Roundup Xtend was evaluated on ELEIN and ABUTH Table 18). The efficacy of pre-mix formulations using TDXL and TTI nozzles was also tested. All standards including Roundup Xtend, Enlist Duo and tank-mix treatments were sprayed using TTI nozzle only, while pre-mix formulations were sprayed with both TTI and TDXL nozzles. The application rate was 560/1120 g/ha ae dicamba/glyphosate. The comparator formulation is potassium glyphosate without any adjuvants. Overall, the four pre-mix formulations performed very well compared to Roundup Xtend and Power-Max+Xtendimax tank-mix. No significant differences were observed between pre-mix formulations using the TTI and TEDx nozzle. On average, TTI was numerically better than TDXL in most cases. Formulation '541, with lower surfactant, was weaker against weeds, but the other three formulations were equivalent to each other and to a Powermax/Xtendimax control.

Field Study:

Field experiments, or trials, were conducted at 16 Monsanto field locations. A group unbalanced block (GUBD) design with three replications was used, with a power of greater than 80%, and equivalence testing with a lower equivalence bound of −10, a delta of <5 when the LSD=5 was used to evaluate. Field preparation during each year consisted of a fall disking followed by a spring disking. In addition to spring disking, if there was a native weed population, a burndown chemistry with no residual was applied at label rate for the field to start clean, and make sure any native weed bank was at the same growth stage as the planted in weed species. Weed seeds (4 broadleaf and 4 grasses, species dependent on location) were planted to plots measuring 10 by 20 ft. Herbicide treatments were applied using a $CO_2$ pressurized backpack sprayer or a precision multi-boom sprayer fitted with Teejet TTI110015 nozzles, at 15 GPS, when weeds measured 4-7 inches high. In all trials, visual weed control or growth inhibition ratings were recorded at 14 and 21 days after treatment (DAT) for each weed species on a 0 to 100% scale where 0=no control or growth inhibition and 100=plant death. Data were analyzed across different weed species with in each weed group i.e. broadleaf weeds and grasses. Trials and replications within trial were considered random effects and herbicide treatments were considered fixed effects.

Across 16 locations, 20 treatments, including tank mixes and 0.5× rates, were evaluated for percent control of broadleaf and grass control as shown in Table 18. Entries 1-4 (dicamba alone controls) targeting only broadleaves, showed no significant difference in average control of broadleaves among the 4 treatments. No significant activity for average percent control of the entries 1-4 is seen on grasses. Entries 5 and 6 (glyphosate alone controls) were not significantly different between treatments on broadleaf or grasses. Entries 7-14 (premix and tank mixes of dicamba and glyphosate) were not significantly different from each other in average broadleaf control and were equivalent to the commercial tank mix check of Xtendimax plus Roundup Powermax plus Intact. When looking at an individual species level, on broadleaf species, the only difference in equivalence is Formulation '541, which is significantly lower in control of redroot pigweed at the full rate, however, when applied at the half X rate, it was equivalent of all other treatments. On individual grass leaf species, the only significant difference is the commercial control with the tank mix of Xtendimax plus Roundup Powermax plus Intact had much lower control of Proso millet. Half X rates were used to try to further separate between treatments, however, all 0.5× entries (15-20) were equivalent to each other in both broadleaf and grass control.

TABLE 17

Efficacy (% control) of Glyphosate + Dicamba Pre-mix Formulations with Built-in DRA

| Trt. | Formulation | Loading (%) | Rate | Unit | Volume | Unit | Nozzle | ABUTH | ELEIN |
|---|---|---|---|---|---|---|---|---|---|
| 1 | Roundup Xtend | 19.8 | 560 | g ae/ha | 15 | gal/A | TTI | 80.8 | 91.7 |
| 2 | Roundup Xtend | 19.8 | 1120 | g ae/ha | 15 | gal/A | TTI | 99.2 | 97.5 |
| 3 | Roundup Powermax | 39.8 | 560 | g ae/ha | 15 | gal/A | TTI | 82.5 | 90.8 |
| 3 | XTENDIMAX | 29.0 | 280 | g ae/ha | 15 | gal/A | TTI | | |
| 4 | INTACT | 100.0 | 0.5 | % v/v | 15 | gal/A | TTI | 85.0 | 87.5 |
| 4 | Roundup Powermax | 39.8 | 560 | g ae/ha | 15 | gal/A | TTI | | |
| 4 | XTENDIMAX | 29.0 | 280 | g ae/ha | 15 | gal/A | TTI | | |
| 5 | Roundup Powermax | 39.8 | 1120 | g ae/ha | 15 | gal/A | TTI | 96.0 | 94.2 |

TABLE 17-continued

Efficacy (% control) of Glyphosate + Dicamba Pre-mix Formulations with Built-in DRA

| Trt. | Formulation | Loading (%) | Rate | Unit | Volume | Unit | Nozzle | ABUTH | ELEIN |
|---|---|---|---|---|---|---|---|---|---|
| 5 | XTENDIMAX | 29.0 | 560 | g ae/ha | 15 | gal/A | TTI | | |
| 6 | INTACT | 100.0 | 0.5 | % v/v | 15 | gal/A | TTI | 100.0 | 95.0 |
| 6 | Roundup Powermax | 39.8 | 1120 | g ae/ha | 15 | gal/A | TTI | | |
| 6 | XTENDIMAX | 29.0 | 560 | g ae/ha | 15 | gal/A | TTI | | |
| 7 | K-glyphosate | 48.2 | 560 | g ae/ha | 15 | gal/A | TTI | 75.8 | 40.8 |
| 7 | XTENDIMAX | 29.0 | 280 | g ae/ha | 15 | gal/A | TTI | | |
| 8 | K-glyphosate | 48.2 | 1120 | g ae/ha | 15 | gal/A | TTI | 90.0 | 84.2 |
| 8 | XTENDIMAX | 29.0 | 560 | g ae/ha | 15 | gal/A | TTI | | |
| 9 | Enlist Duo | 31.4 | 420 | g ae/ha | 15 | gal/A | TDXL | 72.5 | 40.0 |
| 10 | Enlist Duo | 31.4 | 840 | g ae/ha | 15 | gal/A | TDXL | 98.8 | 80.8 |
| 11 | Formulation '541 | 22.2 | 560 | g ae/ha | 15 | gal/A | TDXL | 75.0 | 70.0 |
| 12 | Formulation '541 | 22.2 | 560 | g ae/ha | 15 | gal/A | TTI | 79.2 | 84.2 |
| 13 | Formulation '541 | 22.2 | 1120 | g ae/ha | 15 | gal/A | TDXL | 93.8 | 90.0 |
| 14 | Formulation '541 | 22.2 | 1120 | g ae/ha | 15 | gal/A | TTI | 100.0 | 92.5 |
| 15 | Formulation '551 | 22.0 | 560 | g ae/ha | 15 | gal/A | TDXL | 80.0 | 77.5 |
| 16 | Formulation '551 | 22.0 | 560 | g ae/ha | 15 | gal/A | TTI | 84.2 | 83.3 |
| 17 | Formulation '551 | 22.0 | 1120 | g ae/ha | 15 | gal/A | TDXL | 95.0 | 91.7 |
| 18 | Formulation '551 | 22.0 | 1120 | g ae/ha | 15 | gal/A | TTI | 100.0 | 94.2 |
| 19 | Formulation '542 | 22.0 | 560 | g ae/ha | 15 | gal/A | TDXL | 76.7 | 79.2 |
| 20 | Formulation '542 | 22.0 | 560 | g ae/ha | 15 | gal/A | TTI | 79.2 | 83.3 |
| 21 | Formulation '542 | 22.0 | 1120 | g ae/ha | 15 | gal/A | TDXL | 97.5 | 93.8 |
| 22 | Formulation '542 | 22.0 | 1120 | g ae/ha | 15 | gal/A | TTI | 98.8 | 90.0 |
| 23 | Formulation '533 | 22.0 | 560 | g ae/ha | 15 | gal/A | TDXL | 82.5 | 80.0 |
| 24 | Formulation '533 | 22.0 | 560 | g ae/ha | 15 | gal/A | TTI | 81.7 | 82.5 |
| 25 | Formulation '533 | 22.0 | 1120 | g ae/ha | 15 | gal/A | TDXL | 97.5 | 89.2 |
| 26 | Formulation '533 | 22.0 | 1120 | g ae/ha | 15 | gal/A | TTI | 97.2 | 93.3 |

TABLE 18

Average Post-Emergence Broadleaf Control at 21 DAT for Broadleaf and Grass control.

| Entry | Commercial Name or Formulation # | AI Rate Applied | Percent Broadleaf Control | Percent Grass Control |
|---|---|---|---|---|
| 1 | Xtendimax | 0.5 AE #/A | 82 | 7 |
| 2 | Xtendimax + Intact | 0.5 AE #/A + 0.5%V/V | 79 | 4 |
| 3 | 1:1 MEA Dicamba + TBA Dicamba | 0.5 AE #/A | 78 | 3 |
| 4 | Composition 3-2 | 0.5 AE #/A | 79 | 5 |
| 5 | K-glyphosate | 1.125 AE #/A | 84 | 94 |
| 6 | Roundup Powermax | 1.125 AE #/A | 85 | 97 |
| 7 | Xtendimax + K-glyphosate | 0.5 AE #/A + 1.125 AE #/A | 96 | 93 |
| 8 | Xtendimax + Roundup Powermax + Intact | 0.5 AE #/A + 1.125 AE #/A + 0.5% V/V | 94 | 95 |
| 9 | (1:1 MEA Dicamba + TBA Dicamba) + Roundup Powermax + Intact | 0.5 AE #/A + 1.125 AE #/A + 0.5% V/V | 95 | 98 |
| 10 | Composition 3-2 + Roundup Powermax | 0.5 AE #/A + 1.125 AE #/A | 95 | 99 |
| 11 | Formulation '541 | 1.5 AI #/A | 93 | 94 |
| 12 | Formulation '551 | 1.5 AI #/A | 95 | 96 |
| 13 | Formulation '542 | 1.5 AI #/A | 95 | 97 |
| 14 | Formulation '533 | 1.5 AI #/A | 90 | 95 |
| 15* | Xtendimax + K-glyphosate | 0.25 AE #/A + 0.625 AE #/A | 89 | 89 |
| 16* | Xtendimax + Roundup Powermax + Intact | 0.25 AE #/A + 0.625 AE #/A + 0.5% V/V | 89 | 96 |
| 17* | Formulation '541 | 0.75 AI #/A | 87 | 92 |
| 18* | Formulation '551 | 0.75 AI #/A | 87 | 94 |
| 19* | Formulation '542 | 0.75 AI #/A | 87 | 89 |
| 20* | Formulation '533 | 0.75 AI #/A | 87 | 89 |

Broadleaf species: CHEAL, AMATA, IPOHE, IPOSS, IPOLA, AMASS, AMARE, SIDSP, ABUTH
Grass species: ECHCG, DIGSA, PANDI, SETFA, PANMI, BRAPP
*0.5X rates

TABLE 19

Greenhouse efficacy data for glufosinate/dicamba formulations in ABUTH, AMAPA, and PANMI.

| Trt | Formulation | Loading (%) | Rate (gae/ha) | ABUTH | AMAPA | PANMI |
|---|---|---|---|---|---|---|
| 1 | XTENDIMAX | 29 | 140 | 53.3 | 82.5 | 0.0 |
| 2 | XTENDIMAX | 29 | 280 | 81.3 | 97.5 | 0.0 |
| 3 | XTENDIMAX | 29 | 560 | 87.5 | 97.5 | 0.0 |
| 4 | NPAK_AMS | 100 | 2.5 | 24.2 | 22.5 | 0.0 |
| 4 | LIBERTY | 24.5 | 165 | | | |
| 5 | NPAK_AMS | 100 | 2.5 | 42.5 | 49.2 | 24.2 |
| 5 | LIBERTY | 24.5 | 330 | | | |
| 6 | NPAK_AMS | 100 | 2.5 | 69.8 | 86.7 | 80.8 |
| 6 | LIBERTY | 24.5 | 660 | | | |
| 7 | XTENDIMAX | 29 | 140 | 75.8 | 40.0 | 5.8 |
| 7 | LIBERTY | 24.5 | 165 | | | |
| 8 | LIBERTY | 24.5 | 330 | 74.2 | 66.7 | 65.5 |
| 8 | XTENDIMAX | 29 | 280 | | | |
| 9 | XTENDIMAX | 29 | 560 | 78.3 | 99.7 | 94.0 |
| 9 | LIBERTY | 24.5 | 660 | | | |
| 10 | ENLIST_ONE | 38 | 210 | 30.8 | 70.8 | 0.0 |
| 11 | ENLIST_ONE | 38 | 420 | 71.7 | 84.2 | 1.7 |
| 12 | ENLIST_ONE | 38 | 840 | 95.0 | 99.5 | 7.5 |
| 13 | LIBERTY | 24.5 | 165 | 78.3 | 67.5 | 18.3 |
| 13 | ENLIST_ONE | 38 | 210 | | | |
| 14 | LIBERTY | 24.5 | 330 | 84.7 | 86.7 | 63.8 |
| 14 | ENLIST_ONE | 38 | 420 | | | |
| 15 | LIBERTY | 24.5 | 660 | 89.7 | 90.0 | 90.7 |
| 15 | ENLIST_ONE | 38 | 840 | | | |
| 16 | Formulation 16-1 | 21 | 165 | 71.7 | 40.8 | 0.0 |
| 17 | Formulation 16-1 | 21 | 330 | 72.2 | 59.2 | 54.2 |
| 18 | Formulation 16-1 | 21 | 660 | 77.5 | 94.2 | 97.5 |
| 19 | Formulation 16-2 | 19.3 | 165 | 74.2 | 49.2 | 2.5 |
| 20 | Formulation 16-2 | 19.3 | 330 | 74.2 | 60.0 | 63.3 |
| 21 | Formulation 16-2 | 19.3 | 660 | 71.7 | 96.3 | 84.2 |
| 22 | Formulation 16-3 | 17.5 | 165 | 67.5 | 47.5 | 1.7 |
| 23 | Formulation 16-3 | 17.5 | 330 | 76.8 | 65.0 | 12.5 |
| 24 | Formulation 16-3 | 17.5 | 660 | 72.5 | 92.5 | 65.0 |
| 25 | Formulation 16-4 | 15.8 | 165 | 65.8 | 54.2 | 0.0 |
| 26 | Formulation 16-4 | 15.8 | 330 | 75.5 | 63.3 | 10.8 |
| 27 | Formulation 16-4 | 15.8 | 660 | 75.8 | 93.3 | 70.0 |
| 28 | Formulation 16-5 | 17.5 | 165 | 67.5 | 55.8 | 0.0 |
| 29 | Formulation 16-5 | 17.5 | 330 | 71.7 | 69.2 | 12.5 |
| 30 | Formulation 16-5 | 17.5 | 660 | 78.3 | 100.0 | 79.2 |

Nozzle - TTI110015, Volume - 140 L/ha

TABLE 20

Greenhouse Crop Safety data for glufosinate/dicamba formulations in GLXMA and GOSHI.

| Trt | Formulations | Loading (%) | Rate (g ai/ha or % v/v*) | % INJURY (8DAT) GLXMA HT3 Soy | % INJURY (7DAT) GOSHI BG2XF |
|---|---|---|---|---|---|
| 1 | LIBERTY | 24.5 | 660 | 16.7 | 20.0 |
| 2 | LIBERTY | 24.5 | 1320 | 18.2 | 20.0 |
| 3 | NPAK_AMS | 100 | 2.5* | 8.8 | 18.3 |
| 3 | LIBERTY | 24.5 | 660 | | |
| 4 | NPAK_AMS | 100 | 2.5* | 14.3 | 19.2 |
| 4 | LIBERTY | 24.5 | 1320 | | |
| 5 | XTENDIMAX | 29 | 560 | 0.3 | 1.7 |
| 6 | XTENDIMAX | 29 | 1120 | 2.3 | 4.2 |
| 7 | ROUNDUP_POWERMAX | 39.8 | 1260 | 3.3 | 11.3 |
| 8 | ROUNDUP_POWERMAX | 39.8 | 2520 | 6.2 | 13.3 |
| 9 | XTENDIMAX | 29 | 560 | 5.2 | 4.2 |
| 9 | LIBERTY | 24.5 | 660 | | |
| 10 | XTENDIMAX | 29 | 1120 | 12.8 | 5.2 |
| 10 | LIBERTY | 24.5 | 1320 | | |
| 11 | LIBERTY | 24.5 | 660 | 8.8 | 4.5 |
| 11 | XTENDIMAX | 29 | 560 | | |
| 11 | ROUNDUP_POWERMAX | 39.8 | 1260 | | |
| 12 | LIBERTY | 24.5 | 1320 | 17.5 | 11.3 |
| 12 | XTENDIMAX | 29 | 1120 | | |
| 12 | ROUNDUP_POWERMAX | 39.8 | 2520 | | |
| 13 | Formulation 16-1 | 21 | 660 | 1.2 | 0.3 |
| 14 | Formulation 16-1 | 21 | 1320 | 9.3 | 4.5 |
| 15 | Formulation 16-2 | 19.3 | 660 | 2.5 | 0.0 |
| 16 | Formulation 16-2 | 19.3 | 1320 | 10.2 | 1.2 |
| 17 | Formulation 16-3 | 17.5 | 660 | 0.5 | 0.8 |
| 18 | Formulation 16-3 | 17.5 | 1320 | 7.3 | 5.3 |
| 19 | Formulation 16-4 | 15.8 | 660 | 1.5 | 1.3 |
| 20 | Formulation 16-4 | 15.8 | 1320 | 7.7 | 5.8 |
| 21 | Formulation 16-5 | 17.5 | 660 | 0.8 | 0.8 |
| 22 | Formulation 16-5 | 17.5 | 1320 | 5.2 | 4.0 |
| 23 | ROUNDUP_POWERMAX | 39.8 | 1260 | 9.0 | 4.3 |
| 23 | Formulation 16-1 | 21 | 660 | | |
| 24 | ROUNDUP_POWERMAX | 39.8 | 2520 | 18.3 | 9.8 |
| 24 | Formulation 16-1 | 21 | 1320 | | |
| 25 | Formulation 16-2 | 19.3 | 660 | 9.3 | 2.0 |
| 25 | ROUNDUP_POWERMAX | 39.8 | 1260 | | |
| 26 | Formulation 16-2 | 19.3 | 1320 | 15.8 | 10.2 |
| 26 | ROUNDUP_POWERMAX | 39.8 | 2520 | | |
| 27 | ROUNDUP_POWERMAX | 39.8 | 1260 | 7.5 | 3.7 |
| 27 | Formulation 16-3 | 17.5 | 660 | | |
| 28 | Formulation 16-3 | 17.5 | 1320 | 13.0 | 12.0 |
| 28 | ROUNDUP_POWERMAX | 39.8 | 2520 | | |
| 29 | ROUNDUP_POWERMAX | 39.8 | 1260 | 10.2 | 4.2 |
| 29 | Formulation 16-4 | 15.8 | 660 | | |
| 30 | ROUNDUP_POWERMAX | 39.8 | 2520 | 17.8 | 15.0 |
| 30 | Formulation 16-4 | 15.8 | 1320 | | |
| 31 | Formulation 16-5 | 17.5 | 660 | 7.7 | 2.5 |
| 31 | ROUNDUP_POWERMAX | 39.8 | 1260 | | |
| 32 | Formulation 16-5 | 17.5 | 1320 | 15.0 | 11.0 |
| 32 | ROUNDUP_POWERMAX | 39.8 | 2520 | | |

Nozzle-TTI110015, Volume-140 L/ha

Example 10—Dicamba Microemulsion Compositions with DRA and Vaporgrip™

Acetic acid and potassium hydroxide were mixed in given ratios followed by addition of other ingredients in no specific order to provide microemulsion compositions shown below in Tables 21-26.

TABLE 21

Dicamba Microemulsion Compositions with DRA and 1:1 Vaporgrip™:Dicamba Ratio

| Ingredients | Composition | | | | | |
|---|---|---|---|---|---|---|
| | 21-1 | 21-2 | 21-3 | 21-4 | 21-5 | 21-6 |
| Dicamba stock solution (MEA dicamba, 55.08% ae) | 65.35% | 65.35% | 65.37% | 60.00% | 61.00% | — |
| Acetic Acid | 9.78% | 9.78% | 9.78% | 8.98% | 9.13% | — |
| KOH 45% w/w | 15.20% | 15.20% | 15.20% | 13.96% | 14.19% | — |
| Drift Retardant 2601 | 6.31% | 6.29% | 6.29% | — | — | — |
| Drift Retardant 2602 | — | — | — | 6.06% | 6.16% | 6.07% |
| Surfonic L2-6 | 3.36% | 2.77% | 1.20% | — | 2.80% | 0.91% |
| AGM 550 | — | 0.61% | 2.16% | — | — | 1.21% |
| n-Decanol | — | — | — | 6.61% | 6.72% | — |
| Ethomeen C/12 | — | — | — | 4.41% | — | 5.70% |
| Propylene Glycol | — | — | — | — | — | 33.75% |
| Dicamba Tech (98.30% ae) | — | — | — | — | — | 29.63% |
| Sodium Formate | — | — | — | — | — | 8.95% |
| DI Water | — | — | — | — | — | 13.78% |
| Total | 100.00% | 100.00% | 100.00% | 100.00% | 100.00% | 100.00% |

TABLE 22

Dicamba Microemulsion Compositions with DRA and 1.5:3.0 Vaporgrip™:Dicamba Ratio

| Ingredients | Composition | | | | | |
|---|---|---|---|---|---|---|
| | 22-1 | 22-2 | 22-3 | 22-4 | 22-5 | 22-6 |
| Vapor Grip:Dicamba | 1.5:1 | 1.75:1 | 2:1 | 2.5:1 | 2.8:1 | 3:1 |
| Dicamba stock solution (MEA dicamba, 55.08% ae) | 54.19% | 53.69% | 48.58% | 46.85% | 43.87% | 35.88% |
| Acetic Acid | 12.17% | 14.06% | 14.79% | 14.89% | 9.13% | 16.10% |
| KOH 45% w/w | 18.91% | 21.85% | 22.99% | 23.14% | 14.19% | 25.03% |
| Drift Retardant 2602 | 6.17% | 3.99% | 5.18% | 4.77% | 4.24% | — |
| Drift Retardant 2601 | — | — | — | — | — | 4.08% |
| Surfonic L2-6 | 2.40% | 0.49% | 0.91% | 1.30% | 2.11% | — |
| n-Decanol | 6.17 | 5.92 | 7.71 | 9.05 | 9.87 | 3.95% |
| Decane | — | — | — | — | — | 3.75% |
| Ethomeen C/12 | — | — | — | — | — | 11.20% |
| Total | 100.00% | 100.00% | 100.00% | 100.00% | 100.00% | 100.00% |

TABLE 23

Dicamba Microemulsion Compositions with DRA and 2:1 Vaporgrip™:Dicamba Ratio

| Vapor Grip:Dicamba Ingredients/Sample ID | 2:1 Composition 23-1 | 2:1 Composition 23-2 | 2:1 Composition 23-3 | 2:1 Composition 23-4 |
|---|---|---|---|---|
| Dicamba stock solution (MEA dicamba, 55.08% ae) | 49.84% | — | — | — |
| MEA dicamba (62.58% ae) | — | 47.83% | 47.93% | 47.93% |
| Acetic Acid | 14.90% | 16.25% | 16.29% | 16.29% |
| KOH 45% w/w | 23.17% | 25.35% | 25.32% | 25.32% |
| Drift Retardant 2601 | 6.50% | 6.51% | 6.50% | 6.50% |
| Emulpon CO-550 | 2.65% | 1.85% | 2.56% | 0.83% |

TABLE 23-continued

Dicamba Microemulsion Compositions with DRA and 2:1 Vaporgrip™:Dicamba Ratio

| Vapor Grip:Dicamba Ingredients/Sample ID | 2:1 Composition 23-1 | 2:1 Composition 23-2 | 2:1 Composition 23-3 | 2:1 Composition 23-4 |
|---|---|---|---|---|
| Crodafos T6A | 1.28% | 1.02% | 0.13% | 1.85% |
| Decane | 1.65% | 1.28% | 1.28% | 1.28% |
| FD&C Blue 1 | 0.005% | — | 0.005% | — |
| Total | 100.00% | 100.00% | 100.00% | 100.00% |

TABLE 24

Dicamba Microemulsion Compositions with DRA and 0:1-2:1 Vaporgrip™:Dicamba Ratio

| Vapor Grip:Dicamba Ingredients/Sample ID | 2:1 Composition 24-1 | 2:1 Composition 24-2 | 2:1 Composition 24-3 | 2:1 Composition 24-4 |
|---|---|---|---|---|
| Dicamba stock solution (MEA dicamba, 56.20% ae) | 46.28% | 44.08% | 46.26% | 69.09% |
| Acetic Acid | 14.12% | 13.45% | 14.11% | — |
| KOH 45% w/w | 21.95% | 20.91% | 21.94% | — |
| Drift Retardant 2601 | 6.50% | 6.28% | 6.50% | 6.34% |
| Surfom R 540 | 2.56% | — | — | — |
| Emulpon CO-550 | — | 2.48 | 2.51% | — |
| Crodafos T6A | 1.65% | — | 0.87% | — |
| Crop Oil Concentrate | — | 3.47% | — | — |
| Conosol C-170 | 6.94% | 9.33% | 7.80% | — |
| TAC | — | — | — | 8.21% |
| Surfonic L12-3 | — | — | — | 6.22% |
| DI Water | — | — | — | 10.15% |
| FD&C Blue | 0.005% | 0.005% | 0.005 | — |
| Total | 100.00% | 100.00% | 100.00% | 100.00% |

TABLE 25

Dicamba Microemulsion Compositions with DRA and 2-4 Vaporgrip™:Dicamba

| Vapor Grip:Dicamba Ingredients/Sample ID | 2:1 Composition 25-1 | 2:1 Composition 25-2 | 3:1 Composition 25-3 | 4:1 Composition 25-4 |
|---|---|---|---|---|
| Dicamba stock solution (MEA dicamba, 56.20% ae) | 46.29% | 46.33% | 37.96% | — |
| Dicamba stock solution (MEA dicamba, 55.98% ae) | — | — | — | 33.93% |
| Acetic Acid | 14.13% | 14.15% | 17.37% | 20.63% |
| KOH 45% w/w | 21.97% | 21.99% | 27.03% | 32.22% |
| Drift Retardant 2602 | 5.03% | 5.03% | 4.12% | 4.45% |
| Crodafos O3A | 3.64% | 7.20% | 5.90% | 4.89% |
| Propylene Glycol | — | 5.29% | 4.34% | 3.88% |
| Propylene Carbonate | 8.93% | — | — | — |
| DI Water | — | — | 3.27% | — |
| Total | 100.00% | 100.00% | 100.00% | 100.00% |

TABLE 26

Dicamba ME Compositions with Methyl Soyate/Soy Bean Oil and 2:1 Vaporgrip ™:Dicamba

| Vapor Grip:Dicamba Ingredients/Sample ID | 2:1 Composition 26-1 | 2:1 Composition 26-2 |
|---|---|---|
| Dicamba stock solution (MEA dicamba, 55.98% ae) | 46.52% | 46.45% |
| Acetic Acid | 14.10% | 14.12% |
| KOH 45% w/w | 21.91% | 21.95% |
| Methyl Soyate | 5.02% | — |
| Crodafos O3A | 7.18% | — |
| Propylene Glycol | 5.27% | — |
| Soy Bean Oil | — | 6.43% |
| Emulpon CO-550 | — | 2.49% |
| Crodafos T6A | — | 0.86% |
| Conosol C-170 | — | 7.71% |
| Total | 100.00% | 100.00% |

Example 11—Humidome Volatility of Dicamba Microemulsion Compositions with DRA and Vaporgrip™

A humidone volatility study was performed as described in U.S. Pat. No. 9,743,664, of which its entirety is incorporated herein by reference. The results are shown in Table 27 below.

TABLE 27

Dicamba MEA Compositions with DRA and 2:1 Vapor Grip to Dicamba ratio

| Vapor Grip:Dicamba Ingredients/Sample ID | 2:1 Composition 27-1 | 2:1 Composition 27-2 | 2:1 Composition 27-3 | 2:1 Composition 27-4 | 2:1 Composition 27-5 |
|---|---|---|---|---|---|
| Dicamba stock solution (MEA dicamba, 55.08% ae) | 40.57% | — | — | — | — |
| Dicamba stock solution (MEA dicamba, 56.20% ae) | — | — | — | — | 48.43% |
| MEA dicamba (62.58% ae) | — | 50.17% | 47.83% | 48.00% | — |
| Acetic Acid | 12.13% | 15.00% | 16.25% | 16.31% | 14.79% |
| KOH 45% w/w | 18.84% | 23.30% | 25.26% | 25.35% | 22.99% |
| Drift Retardant ERS 2602 | — | — | — | — | 5.18% |
| Drift Retardant ERS 2601 | 4.17% | 7.18% | 6.51% | 6.51% | — |
| Emulpon CO-550 | — | 2.76% | 1.85% | 1.54% | — |
| Crodafos T6A | — | — | 1.02% | 1.02% | — |
| Surfonic L12-3 | 2.98% | — | — | — | — |
| Surfonic L12-6 | — | — | — | — | 0.91% |
| n-Decanol | — | — | — | — | 7.71% |
| Decane | 1.19% | 1.57% | 1.28% | 1.28% | — |
| Ethomeen C/12 | 20.11% | — | — | — | — |
| Total | 100.00% | 100.00% | 100.00% | 100.00% | 100.00% |

TABLE 28

Humidome Volatility of Dicamba Microemulsion with DRA and 2:1 to 4:1 Vaporgrip ™:Dicamba Ratio

| Product ID | Dicamba, ng/L | | |
|---|---|---|---|
| Vapor Grip:Dicamba | 2:1 | 3:1 | 4:1 |
| Composition 23-1 | 0.000 | | |
| Composition 23-1-Pmax | 0.015 | | |
| Xmax-Pmax- potassium acetate | 0.001 | | |
| Composition 23-2 | 0.001 | | |
| Composition 23-2-Pmax | 0.043 | | |
| Xmax-Pmax-potassium acetate | 0.003 | | |
| Composition 27-2 | 0.001 | | |
| Composition 27-2-Pmax | 0.043 | | |
| Xmax-Pmax-potassium acetate | 0.003 | | |
| Composition 27-5 | 0.001 | | |
| Composition 27-5-Pmax | 0.031 | | |
| Xmax-Pmax-potassium acetate | 0.001 | | |
| Composition 25-2 | 0.001 | | |
| Composition 25-2-Pmax | 0.070 | | |
| Xmax-Pmax-potassium acetate | 0.002 | | |
| Composition 25-1 | 0.001 | | |
| Composition 25-1-Pmax | 0.025 | | |
| Xmax-Pmax-potassium acetate | 0.001 | | |

TABLE 28-continued

Humidome Volatility of Dicamba Microemulsion with
DRA and 2:1 to 4:1 Vaporgrip™:Dicamba Ratio

| Product ID | Dicamba, ng/L | | |
|---|---|---|---|
| Vapor Grip:Dicamba | 2:1 | 3:1 | 4:1 |
| Composition 24-1 | 0.001 | | |
| Composition 24-1-Pmax | 0.013 | | |
| Xmax-Pmax-potassium acetate | 0.004 | | |
| Composition 25-3 | | 0.000 | |
| Composition 25-3-Pmax | | 0.012 | |
| Xmax-Pmax-potassium acetate | | 0.002 | |
| Composition 24-2 | 0.001 | | |
| Composition 24-2-Pmax | 0.073 | | |
| Xmax-Pmax-potassium acetate | 0.005 | | |
| Composition 27-3 | 0.001 | | |
| Composition 27-4 | 0.001 | | |
| Xmax-Pmax-potassium acetate | 0.004 | | |
| Composition 27-1 | 0.000 | | |
| Composition 22-6 | | 0.000 | |
| Xmax-Pmax-potassium acetate | 0.003 | | |
| Composition 25-4 | | | 0.001 |
| Composition 25-4-Pmax | | | 0.005 |
| Xmax-Pmax-potassium acetate | | | 0.003 |

Example 12—2,4-D and Glyphosate Microemulsion Compositions with DRA

Method of preparation: Water and DMAPA (3-(dimethylamino)-1-propylamine) were added to a glass bottle and stirred until homogeneous. Then added 2,4-D acid, followed by glyphosate acid wetcake and stirred until fully dissolved. Then Drift Retardant 2602 and surfactant Crodafos™ O5A were added and stirred until homogenous solution was obtained. Agnique® PG 264/Ethoquad®/Agnique® PG8107/AGM 550 were added last and subsequently stirred for 20 minutes until clear a formulation was obtained. See, Table 29.

TAB wherein i+j+k=10 to 50 and r+s+t=3 to 12 in an amount of about 3% to about 50% by weight of the drift retardant agent; and
(c) an emulsifying agent selected from the group consisting of a phosphate ester, an alkylpolysaccharide, an alkoxylated castor oil, and a combination thereof.

2. The herbicidal composition concentrate of claim 1, wherein one or more of the following are satisfied:
(i) the at least one auxin herbicide is present in an amount (acid equivalent weight) of about 5% to about 50% by weight of the composition concentrate;
(ii) the at least one drift retardant agent is present in an amount of about 2% to about 10% by weight of the composition concentrate; and
(iii) the emulsifying agent is present in an amount of about 1% to about 20% by weight of the composition concentrate.

3. The herbicidal composition concentrate of claim 1, wherein the at least one drift retardant agent comprises:
soybean oil or a methyl ester of soybean oil in an amount of about 85% to about 95% by weight of the drift retardant agent;
a compound of Formula I in an amount of about 1% to about 5% by weight of the drift retardant agent; and
a compound of Formula II in an amount of about 10% to about 30% by weight of the drift retardant agent.

4. The herbicidal composition concentrate of claim 1, wherein the compound of Formula I is poly (oxy-1,2-ethanediyl), α-[(9Z)-1-oxo-9-octadecen-1-yl]-ω-hydroxy- and the compound of Formula II is octadecanoic acid, 12-hydroxy-, homopolymer, ester with α, α', α"-1,2,3-propanetriyltris [ω-hydroxypoly (oxy-1,2-ethanediyl)] and/or the at least one auxin herbicide is selected from the group consisting of dicamba, an agriculturally acceptable salt of dicamba, an agriculturally acceptable ester of dicamba, 2,4-D, an agriculturally acceptable salt of 2,4-D, an agriculturally acceptable ester of 2,4-D, and a combination thereof.

5. The herbicidal composition concentrate of claim 1, wherein the at least one auxin herbicide is an agriculturally acceptable salt of dicamba, wherein the salt is selected from group consisting of N,N-[aminopropyl]methylamine, monoethanolamine, dimethylamine, isopropylamine, diglycolamine, a potassium salt, and a sodium salt, and a combination thereof.

6. The herbicidal composition concentrate of claim 1, further comprising one or more of: (i) at least one monocarboxylic acid or a monocarboxylate thereof; and (ii) at least one further herbicide.

7. The herbicidal composition concentrate of claim 6, wherein the at least one monocarboxylic acid or the monocarboxylate thereof is present in an amount (acid equivalent weight) of about 5% to about 30% by weight of the composition concentrate; and
wherein the at least one further herbicide is present in an amount (acid equivalent weight) of about 10% to about 50% by weight of the composition concentrate.

8. The herbicidal composition concentrate of claim 6, wherein the molar ratio of the at least one monocarboxylic acid or the monocarboxylate thereof to the auxin herbicide is from about 3:10 to about 10:1.

9. The herbicidal composition concentrate of claim 6, wherein the monocarboxylic acid is acetic acid or the monocarboxylate is potassium acetate; and
wherein the at least one further herbicide is selected from the group consisting of glyphosate, an agriculturally acceptable salt of glyphosate, glufosinate, an agriculturally acceptable salt of glufosinate, and a combination thereof.

10. The herbicidal composition concentrate of claim 1, wherein the composition concentrate is an emulsion or a micro-emulsion.

11. A method of making an herbicidal composition concentrate, the method comprising:
admixing at least one auxin herbicide with at least one drift retardant agent and an emulsifying agent,
wherein the at least one drift retardant agent comprises:
soybean oil or a methyl ester of soybean oil in an amount of about 80% to about 95% by weight of the drift retardant agent;
a compound according of Formula I:

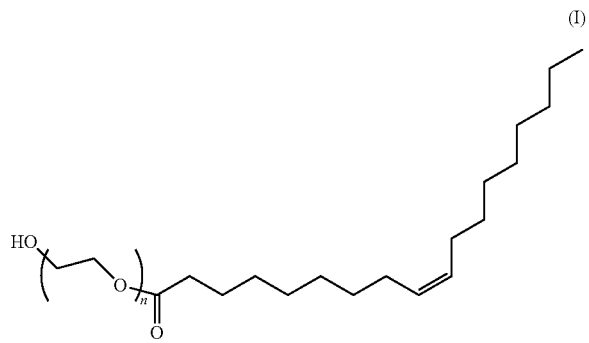

wherein n is 50-250 in an amount of about 0.25% to about 10% by weight of the drift retardant agent; and
a compound of Formula II:

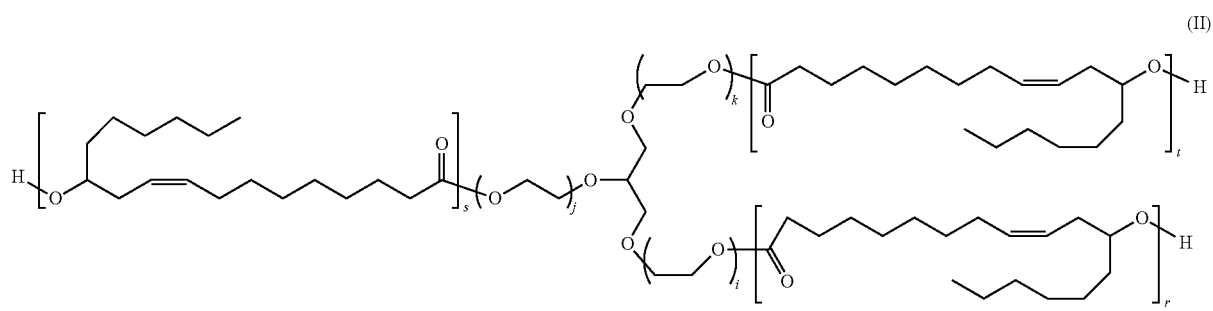

wherein i+j+k=10 to 50 and r+s+t=3 to 12 in an amount of about 3% to about 50% by weight of the drift retardant agent; and wherein the emulsifying agent is selected from the group consisting of a phosphate ester, an alkylpolysaccharide, an alkoxylated castor oil, and a combination thereof to form the herbicidal composition concentrate.

12. The method of claim 11, wherein the composition concentrate comprises one or more of:
(i) the at least one auxin herbicide in an amount (acid equivalent weight) of about 5% to about 50% by weight;
(ii) the at least one drift retardant agent in an amount of about 2% to about 10% by weight of the composition concentrate; and
(iii) the emulsifying agent in an amount of about 1% to about 20% by weight of the composition concentrate.

13. The method of claim 11, wherein the compound of Formula I is poly (oxy-1,2-ethanediyl), α-[(9Z)-1-oxo-9-octadecen-1-yl]-ω-hydroxy- and the compound of Formula II is octadecanoic acid, 12-hydroxy-, homopolymer, ester with α, α', α"-1,2,3-propanetriyltris [ω-hydroxypoly (oxy-1,2-ethanediyl)] and/or the at least one auxin herbicide is selected from the group consisting of dicamba, an agriculturally acceptable salt of dicamba, an agriculturally acceptable ester of dicamba, 2,4-D, an agriculturally acceptable salt of 2,4-D, an agriculturally acceptable ester of 2,4-D, and a combination thereof.

14. The method of claim 11, wherein the at least one auxin herbicide is an agriculturally acceptable salt of dicamba, wherein the salt is selected from group consisting of N,N-[aminopropyl]methylamine, monoethanolamine, dimethylamine, isopropylamine, diglycolamine, a potassium salt, and a sodium salt, and a combination thereof.

15. The method of claim 11, further comprising one or more of:
(i) admixing the at least one auxin herbicide with water to form an aqueous solution prior to admixing with the at least one drift retardant agent and the emulsifying agent;
(ii) admixing at least one monocarboxylic acid or a monocarboxylate thereof with the at least one auxin herbicide, the at least one drift retardant agent, and the emulsifying agent; and
(iii) admixing at least one further herbicide with the at least one auxin herbicide, the at least one drift retardant agent, and emulsifying agent.

16. The method of claim 15, wherein the composition concentrate comprises the at least one monocarboxylic acid or the monocarboxylate thereof in an amount (acid equivalent weight) of about 5% to about 30% by weight of the composition concentrate; and
wherein the composition concentrate comprises the at least one further herbicide in an amount (acid equivalent weight) of about 15% to about 60% by weight of the composition concentrate.

17. The method of claim 15, wherein the molar ratio of the at least one monocarboxylic acid or the monocarboxylate thereof to the auxin herbicide is from about 3:10 to about 10:1.

18. The method of claim 15, wherein the monocarboxylic acid is acetic acid or the monocarboxylate is potassium acetate; and
wherein the at least one further herbicide is selected from the group consisting of glyphosate, an agriculturally acceptable salt of glyphosate, glufosinate, an agriculturally acceptable salt of glufosinate, and a combination thereof.

19. The method of claim 11, wherein the at least one drift retardant agent comprises:
soybean oil or a methyl ester of soybean oil in an amount of about 85% to about 95% by weight of the drift retardant agent;
a compound of Formula I in an amount of about 1% to about 5% by weight of the drift retardant agent; and
a compound of Formula II in an amount of about 10% to about 30% by weight of the drift retardant agent.

20. A drift retardant agent composition for use in the preparation of a herbicidal application mixture, the drift retardant agent composition comprising:
(a) at least one drift retardant agent comprising:
soybean oil or a methyl ester of soybean oil;
poly (oxy-1,2-ethanediyl), α-[(9Z)-1-oxo-9-octadecen-1-yl]-ω-hydroxy-; and
octadecanoic acid, 12-hydroxy-, homopolymer, ester with α, α', α"-1,2,3-propanetriyltris [ω-hydroxypoly (oxy-1,2-ethanediyl)]; and
(b) an emulsifying agent selected from the group consisting of a phosphate ester, alkylpolysaccharide, an alkoxylated castor oil, and a combination thereof.

* * * * *